US012461763B2

(12) United States Patent
Madishetti et al.

(10) Patent No.: US 12,461,763 B2
(45) Date of Patent: Nov. 4, 2025

(54) METHOD AND SYSTEM FOR PROVISIONING AND MANAGEMENT OF DYNAMIC DESKTOPS

(71) Applicant: Workspot, Inc., Campbell, CA (US)

(72) Inventors: Shiva Prasad Madishetti, Frisco, TX (US); Virabrahma Prasad Krothapalli, San Jose, CA (US); Edward A. Seidman, Rochester, NY (US); Raminder S. Channe, San Jose, CA (US); Amitabh Bhuvangyan Sinha, San Jose, CA (US); Jimmy Chang, Mountain View, CA (US); David T. Sulcer, Pacifica, CA (US); Mahesh Kumar Vojjala, Sunnyvale, CA (US)

(73) Assignee: WORKSPOT, INC., Campbell, CA (US)

( * ) Notice: Subject to any disclaimer, the term of this patent is extended or adjusted under 35 U.S.C. 154(b) by 401 days.

(21) Appl. No.: 17/935,395

(22) Filed: Sep. 26, 2022

(65) Prior Publication Data

US 2023/0418634 A1 Dec. 28, 2023

Related U.S. Application Data

(60) Provisional application No. 63/354,439, filed on Jun. 22, 2022.

(51) Int. Cl.
*G06F 3/00* (2006.01)
*G06F 9/451* (2018.01)
*G06F 9/54* (2006.01)

(52) U.S. Cl.
CPC ............. *G06F 9/452* (2018.02); *G06F 9/54* (2013.01)

(58) Field of Classification Search
CPC .......................................................... G06F 9/48
See application file for complete search history.

(56) References Cited

U.S. PATENT DOCUMENTS

| 8,209,695 | B1 * | 6/2012 | Pruyne .................. G06F 9/5077 718/104 |
| 9,841,890 | B2 * | 12/2017 | Kitao ....................... G06F 3/041 |
| 11,562,413 | B1 * | 1/2023 | Nunziata ............ G06Q 30/0619 |

(Continued)

FOREIGN PATENT DOCUMENTS

EP 4180993 A1 * 5/2023 ........... G06F 16/955

OTHER PUBLICATIONS

Stefan E. Gillette, Cloud Computing and Virtual Desktop Infrastructures in Afloat Environments. (Year: 2012).*

(Continued)

*Primary Examiner* — Lechi Truong
(74) *Attorney, Agent, or Firm* — NIXON PEABODY LLP

(57) ABSTRACT

A system and method for providing access to a virtual cloud desktop by a client device is disclosed. The requirements of a logical desktop are determined. Virtual desktops and associated cloud resources meeting the requirements of the logical desktop are determined. Each of the virtual desktops and cloud resources are associated with a cloud region. The virtual desktops that meet the requirements are prioritized. A request is received from the user for the logical desktop. The highest priority virtual desktop is selected. The selected virtual desktop is made accessible to the client device.

20 Claims, 15 Drawing Sheets

(56) References Cited

U.S. PATENT DOCUMENTS

| | | | |
|---|---|---|---|
| 2009/0305699 A1* | 12/2009 | Deshpande | H04W 48/16 |
| | | | 455/434 |
| 2012/0198346 A1* | 8/2012 | Clemm | H04L 43/0817 |
| | | | 715/736 |
| 2013/0007465 A1* | 1/2013 | Movassaghi | G06F 21/34 |
| | | | 713/185 |
| 2015/0295796 A1* | 10/2015 | Hsiao | H04L 41/0813 |
| | | | 715/738 |
| 2017/0046055 A1* | 2/2017 | Sonwane | G06F 16/93 |
| 2017/0131867 A1* | 5/2017 | Anbil Parthipan | G06N 5/022 |
| 2017/0186147 A1* | 6/2017 | He | G06T 7/0002 |
| 2017/0300316 A1* | 10/2017 | Lopyrev | H04L 67/34 |
| 2018/0336058 A1* | 11/2018 | Kim | G06F 9/45558 |
| 2019/0114059 A1* | 4/2019 | Chakra | G06F 9/451 |
| 2020/0213387 A1* | 7/2020 | Avila | H04L 67/02 |
| 2021/0026661 A1* | 1/2021 | Sulcer | G06F 9/452 |
| 2021/0149846 A1* | 5/2021 | McGregor | G06F 3/0641 |
| 2022/0094686 A1* | 3/2022 | Jain | H04L 63/20 |

OTHER PUBLICATIONS

Jinho Hwang, Adaptive Dynamic Priority Scheduling for Virtual Desktop Infrastructures. (Year: 2012).*

\* cited by examiner

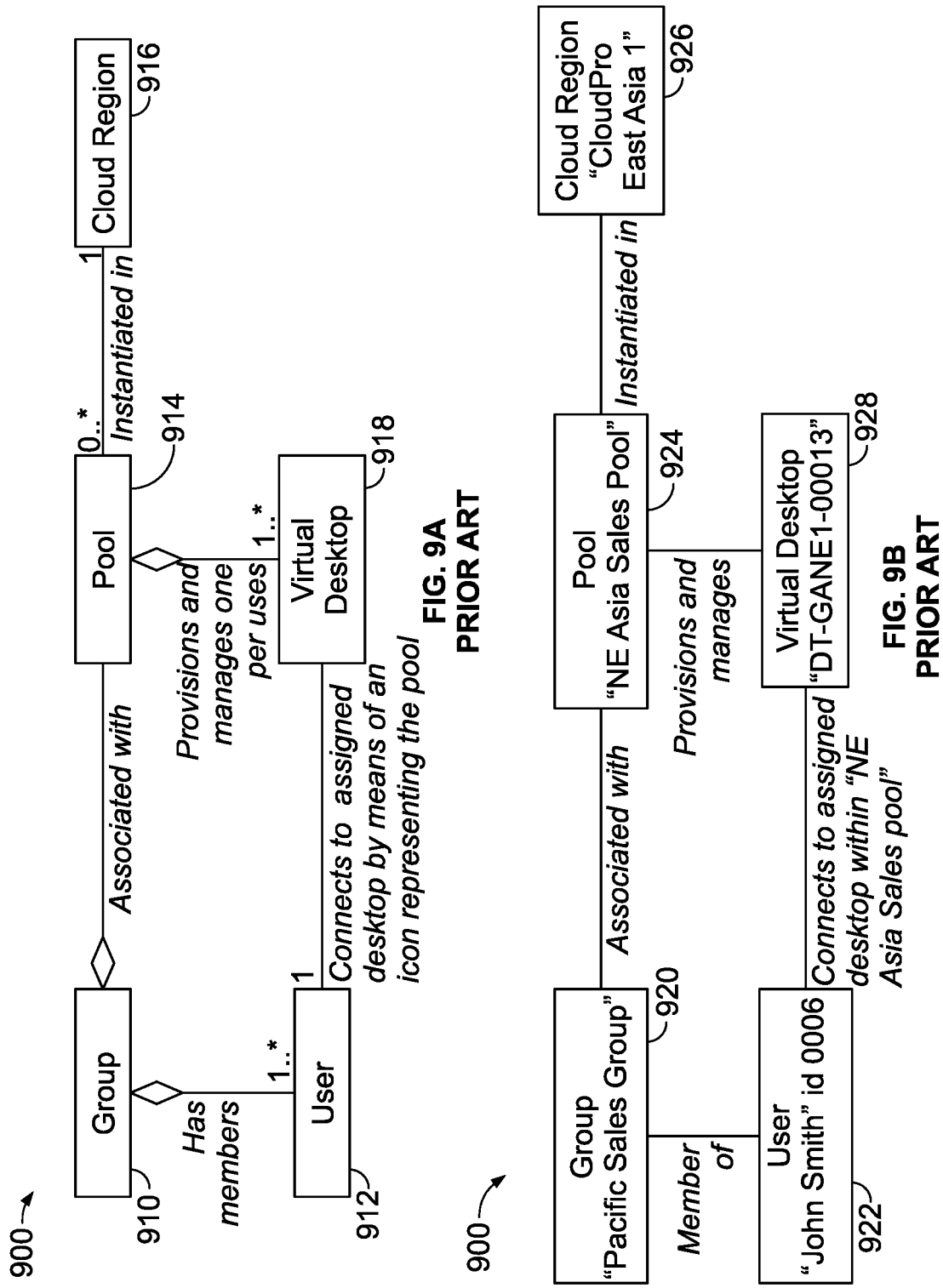

METHOD AND SYSTEM FOR PROVISIONING AND MANAGEMENT OF DYNAMIC DESKTOPS

PRIORITY CLAIM

This application claims priority to U.S. Provisional Application No. 63/354,439, filed on Jun. 22, 2022. The entirety of that application is hereby incorporated by reference.

TECHNICAL FIELD

The present disclosure relates generally to network-based virtual desktop systems. More particularly, aspects of this disclosure relate to a system that provides a virtual desktop user dynamic access to one of multiple desktops.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing, which is the on-demand availability of computer system resources, such as data storage and computing power, over the public internet or other networks without direct active management by the user.

Users of networked computers such as in a cloud-based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

Remote desktop virtualization solutions have been available for over a decade. These solutions provide virtual desktops to network users. In remote desktop virtualization offerings, there is typically a capability of associating a remote desktop virtualization template in a particular cloud region with a remote desktop virtualization pool in the same cloud region as part of the general configuration model. This remote desktop virtualization template is customized with the image of the right desktop for a particular remote desktop virtualization use case.

Companies lose revenue when a user cannot access their cloud desktop because of issues out of their control. There is a need in Cloud based computing to provide a logical desktop in an optimal fashion as defined by requirements, including but not limited to user experience and costs. When needed, a cloud desktop, in the form of an instantiated virtual machine in a specific cloud region, is made available to the end user, with all necessary state synchronized with any previously instantiated cloud desktop used by the end user, to reliably fulfill the requirements of the logical desktop. This addresses the desktop availability caused by cross cloud/cross regional issues.

There is a need for a Cloud based system that automatically provides the optimal choice of cloud and region to avoid unnecessary costs or lack of availability of virtual resources, based on changing conditions. Thus, there is a need for a system that provides a cloud fabric of desktop infrastructure to offer one logical desktop out of multiple virtual desktops.

SUMMARY

One disclosed example is a virtual desktop system including a plurality of virtual desktops and associated cloud resources. Each of the virtual desktops and associated cloud resources meet requirements for a logical desktop provided to a client device. Each of the virtual desktops and associated cloud resources is associated with a corresponding cloud region. The system includes a prioritized list of the plurality of virtual desktops. The system includes a control plane coupled to the cloud region. In response to a client device application operated by a user requesting the logical desktop, the control plane selects the one of the plurality of virtual desktops having the highest priority on the prioritized list and provides access to the virtual desktop to the client device.

Another example is a method for providing a logical desktop to a user operating a client device. The requirements of the logical desktop are determined. A plurality of virtual desktops and associated cloud resources meeting the requirements of the logical desktop are determined. Each of the virtual desktops and associated cloud resources are associated with a cloud region coupled to a control plane. Each of the determined plurality of virtual desktops is prioritized via the control plane. A request from the client device for the logical desktop is received. The highest priority virtual desktop of the plurality of virtual desktops is selected via the control plane. Access to the selected virtual desktop is provided to the client device.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 9A is a generic block diagram of a known model of object relations in the example cloud desktop fabric in FIG. 2;

FIG. 9B is a specific example of a known model of object relations in FIG. 9A;

Figure 1:
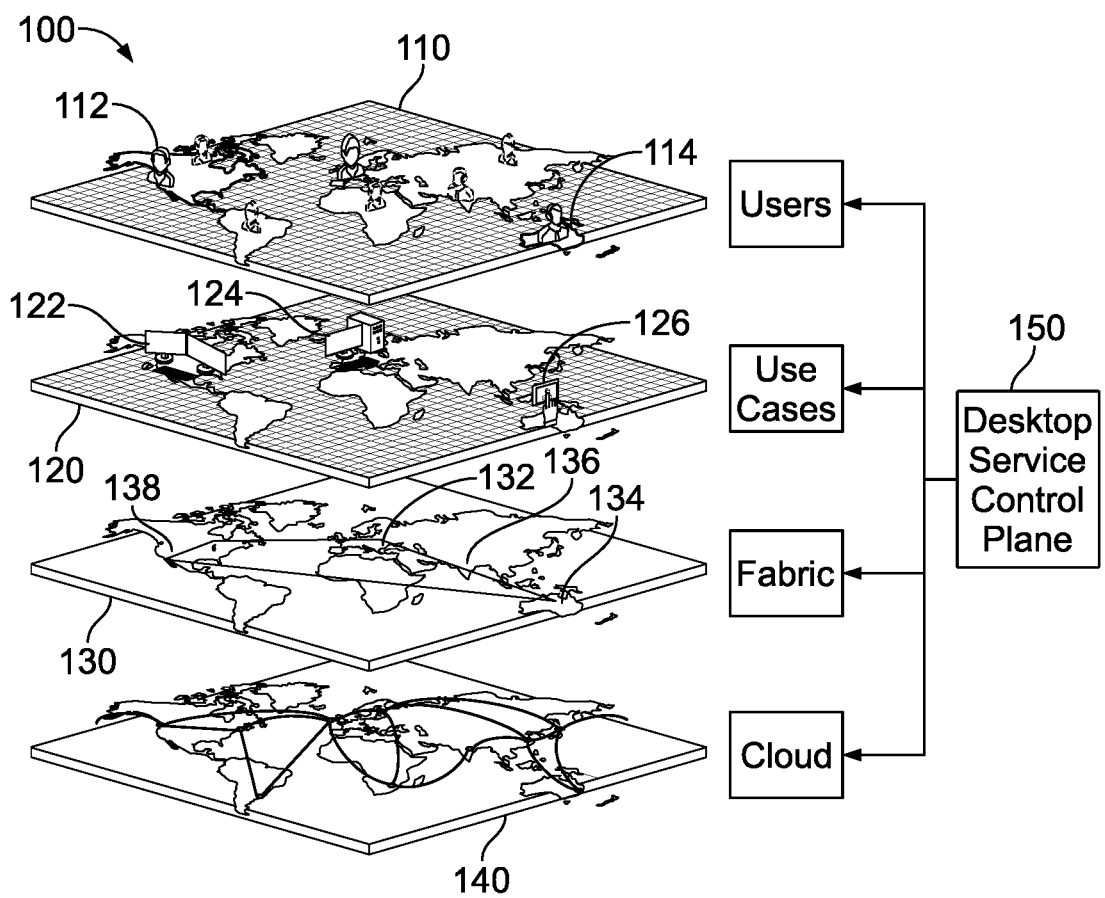
FIG. 1 is a high-level block diagram illustrating an example cloud desktop fabric allowing access to virtual desktops globally.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a distributed network of desktop service capabilities that are centrally administered and managed. The system is elastic, which allows the ability to provide desktop resources from multiple cloud regions that meet desktop requirements for a user in a dynamic way. The example system thus ensures consistent support for a logical desktop associated with a user by selecting from a prioritized list of available virtual desktops and associated cloud resources depending on parameters such as availability, quality of service, and cost. Any of the virtual desktops can be used to provide the logical desktop for the user. Thus, all of the virtual desktops are exclusively associated with the user and selecting any of them from the prioritized lists allows the user access to the desktop.

The following are definitions of terms used in this disclosure that relate in general to the virtual desktop system.

An agent is software that performs certain operations and monitoring tasks that has direct access to, or runs on, some virtual computing resource and may maintain a duplex communication channel with a desktop service control plane.

An API is a set of specific, controlled, well-defined functional entry points to get, create, update, and delete resources and otherwise change the state of a remote system.

A cloud API is, in this context, an API specific to a cloud service provider.

A connection broker is desktop service resource sometimes used to dynamically connect desktop clients with desktops.

A cloud provider, also known as a cloud service provider, in this context, is an Infrastructure as a Service provider (IaaS) that provides virtual machines as a service in one or more cloud regions.

A cloud region is a collection of computing resources, such as virtual machine hosts, virtual networks, virtual storage devices, protocol gateways, servers, or other infrastructure in one physical location. The virtual resources are abstractions available to cloud customers, actually implemented by physical hardware such as networking equipment including but not limited to routers, hubs, switches, persistent storage devices such as disks, CPU and/or GPU processors, random access memory (RAM), security appliances including firewalls, operating system software, and other components that may be employed in a cloud regional data center to provide a hosting environment for virtual machines, sometimes known as a "server", "host", or "node." A cloud region is typically described as being part of a public cloud, all the descriptions of the functionality apply equally to a private cloud whose availability is restricted to certain organizations.

A cloud availability zone is an isolated location within a cloud region, with some services that are redundant to other cloud availability zones within the same cloud region, in order to provide a higher level of availability in the event of an outage in a one location. A cloud service provider may allow resources such as virtual machines to be provisioned in a multiple specific availability zones, or may manage logical resources to be spread across availability zones automatically based on availability requirements, such as requiring that cloud resources are still available in the event of a power outage in one zone.

A virtual desktop is the information and capability needed to instantiate and manage, whenever needed, a specific virtual machine providing interactive desktop software or applications, or other experiences provided by remote desktop virtualization via a desktop service utilizing a cloud region.

A pool is a configuration object that describes a collection of virtual desktops, that is associated with a group of cloud desktop users, and certain attributes they have in common. For example, it may describe the common icon image used to launch a desktop.

A logical desktop represents the ability to provide a virtual desktop experience to a user, including the current state of the desktop, utilizing one or more virtual desktops that may exist in the same or different cloud regions.

A logical pool is a configuration object that describes a collection of logical desktops, that is associated with a group of cloud desktop users and certain attributes they have in common. For example, a logical pool may describe a list of gateways to connect to in order to launch a virtual desktop to fulfill a request to launch.

A client, or desktop client (sometimes called a VDI client) is a software application that provides display and input access to a desktop as part of a desktop service. It may be installed on a standard desktop or mobile operating system, or be pre-installed on dedicated hardware devices, or downloaded dynamically via a web browser application, or deployed in some other way. Like an agent, it may also perform certain operations and monitoring tasks and may maintain a duplex communication channel with a desktop service control plane.

A cloud desktop fabric is a scalable virtual desktop interface system that orchestrates multiple regional fabric regions to allow a user anywhere to access a virtual desktop interface.

A desktop service resource refers to some virtualized hardware, networking service, or virtual machine, other than the desktops themselves, that exists to support a desktop service for use by cloud desktop users.

A desktop service is remote desktop virtualization hosted on a public or private cloud, provided as a turnkey managed service.

A desktop service control plane is an application that implements and manages a desktop service.

A cloud desktop user, also referred to as user, is a person who uses a cloud desktop.

An enterprise connector is a desktop service resource used to integrate the network of a desktop service with the network services, including but not limited to directory services that support authentication and authorization.

A gateway, sometimes referred to as a protocol gateway, is a type of desktop service resource running a service that manages secure access to a desktop supporting protocols including a remote display protocol (RDP). In this disclosure, gateways are accessed as a gateway cluster unless explicitly noted otherwise.

A gateway cluster is a set of gateways managed together for load balancing purposes.

Infrastructure as a service (IaaS) is a set of virtualized computing resources available from a cloud service provider.

An infrastructure template is a collection of desktop service resources and/or definitions that provide a blueprint for replicating a cloud region's resources.

A multi-tenant desktop service control plane is a single desktop service control plane implementation that is used by multiple customers in such a way that no single customer is aware of or is impacted by activities of the others.

The term "near-real-time" refers to the processing timeframe of a system in which root cause information is produced without significant delay, close enough in time from the triggering events to be acted upon immediately to achieve business goals, typically measured as under one minute.

A non-persistent desktop user is a desktop user that is allocated a new desktop for each login session.

A persistent desktop user is a desktop user that is allocated a specific desktop for exclusive use over multiple connection sessions.

Pool desktops are a set of desktops managed by the desktop service control plane as a unit.

Remote desktop virtualization is software technology that separates the desktop environment and associated application software from the physical client device that is used to access it in a client/server environment.

A virtual application is the capability to access a user experience for a particular application running remotely.

A virtualized computing resource is a virtual machine that is created by an Infrastructure as a Service (IaaS) provider.

A virtual machine is an emulation of a physical computer that can be accessed over a network.

A virtual network is hardware and software network resources combined into a single, software-based administrative entity, made available by an Infrastructure as a Service (IaaS) provider.

Virtual storage is storage resources provided as part of Infrastructure as a Service.

FIG. 1 shows a high level block diagram of a cloud desktop service system 100. The cloud desktop service system 100 may also be referenced as a global desktop system because it provides virtual desktops for users globally. The cloud desktop service system 100 includes four layers, a users layer 110, a use cases layer 120, a fabric layer 130, and a cloud layer 140.

The users layer 110 represents desktop users having the same computing needs, that may be located anywhere in the world. In this example, the users layer 110 includes users 112 and 114, who are in geographically remote locations and access desktops via computing devices.

The use cases layer 120 represents common logical pools of desktops available to serve the users, whereby each logical pool may be based on common desktop requirements. There can be multiple logical pools based on which groups users belong to and their job requirements. In this example, the pool for the users 112 and 114 may be one of a developer desktop pool 122, an engineering workstation pool 124, or a call center application pool 126. The desktops each include configuration and definitions of resources necessary to offer the desktop. Although a user accesses a single desktop, the desktop may be supported by multiple desktop resources, each supported by different cloud regions based on the requirement of the desktop in the logical pool.

For example, pools such as the developer desktop pool 122 or the engineering workstation pool 124 allow users in the pool a desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

The fabric layer 130 includes definitions and configurations for infrastructure and desktop service resources, including gateways, desktop templates, and others that are applied to cloud regions. The resources are maintained as cloud regions such as cloud region 132, 134, 136, and 138. The cloud regions can be added or removed as needed.

The cloud layer 140 implements the resources defined by the use case layer 120 and fabric layer 130, including virtual desktops, infrastructure, and other virtual resources, all of which are virtual machines or other virtual resources hosted in a public or private cloud.

The layers 110, 120, 130, and 140 are created and orchestrated by a desktop service control plane 150 that can touch all the layers. The desktop service control plane 150 is a key component to orchestrate a cloud desktop service system such as the cloud desktop service system 100 in FIG. 1. The desktop service control plane 150 can manage the entire lifecycle of a desktop service implementation, from creating and managing the required desktops, to monitoring and analyzing the stream of operational data collected, enforcing security policies, and optimizing the experience for IT administrators and desktop users. For example, the desktop service control plane 150 may register a set of a virtual networks, virtual storage resources, and more. Within a virtual network, the control plane 150 may further register and coordinate the use of gateways, enterprise connectors, desktop templates, connection brokers, and more.

The two cloud desktop users 112 and 114 in different parts of the world who are each able to access an example high-performance desktop service from the cloud desktop service system 100. As will be explained below, the cloud desktop service system 100 eliminates the need to divide cloud users with similar requirements into user groups specific to a region. Rather, all users having similar needs throughout the world are considered as a single worker pool. Cloud desktop users, such as cloud desktop users 112 and 114, each may use a client device to access the desktop service. Client devices may be any device having computing and network functionality, such as a laptop computer, desktop computer, smartphone, or tablet. Client devices execute a desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc. In this example, the client application displays an icon of the desktop or desktops available to the user. As will be explained, the desktop is made available to the user through the client application on the user device.

Figure 2:
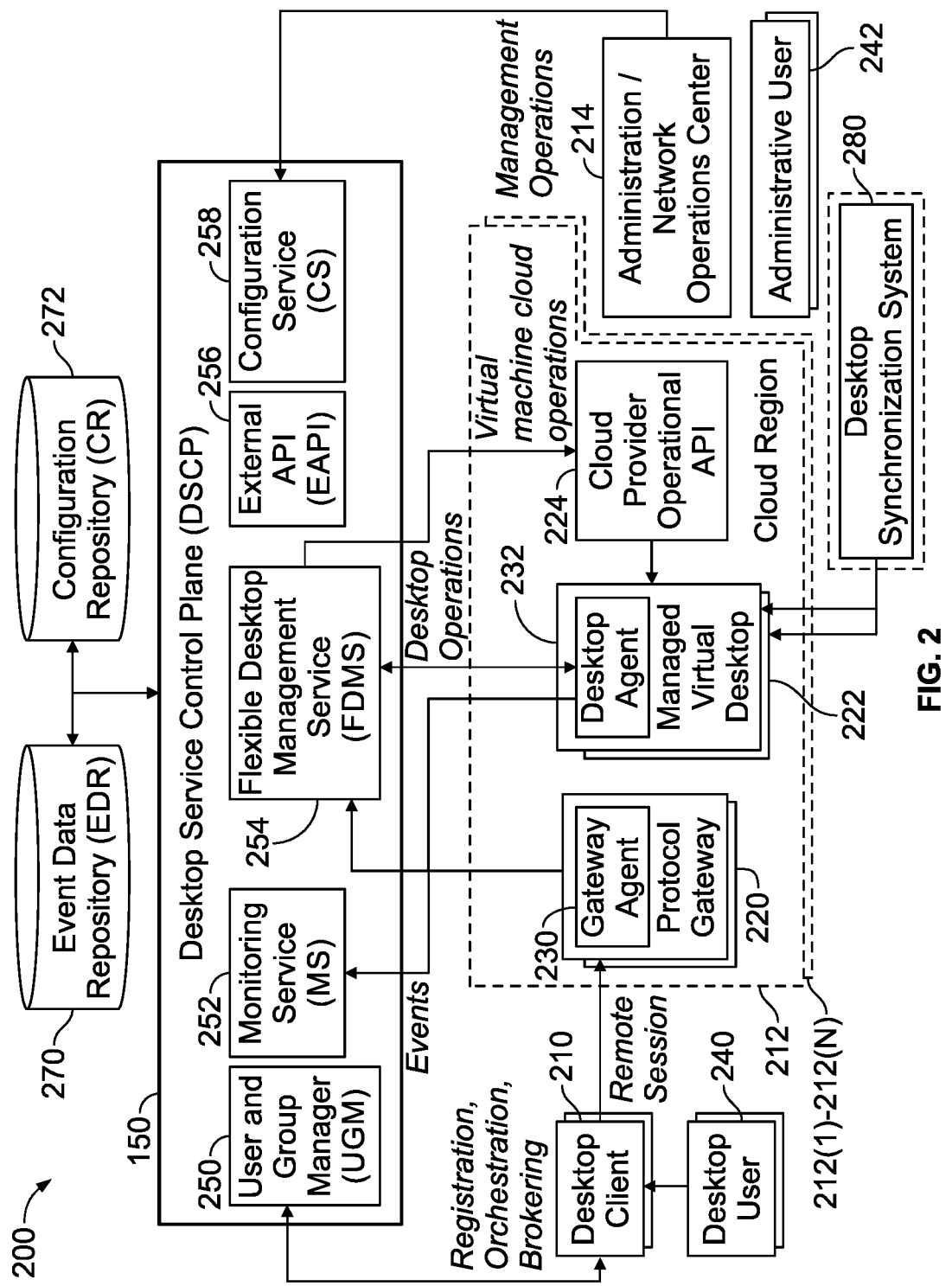
FIG. 2 is a block diagram of a cloud region and desktop service control plane of the example cloud desktop fabric in FIG. 1.

FIG. 2 is a block diagram of some examples of components of the cloud desktop service system 100, including an example set of desktop clients 210, a cloud region 212, and an administration center 214, that interact with and can be orchestrated by the desktop service control plane 150. The desktop client 210 communicates with the desktop service control plane 150 in order to be registered with the fabric, assigned a desktop, remotely configured, and for other purposes. There may be multiple cloud regions (e.g., cloud regions 212(1) to 212(N)) similar to the cloud region 212, but only one cloud region 212 is shown in detail for simplicity of explanation. The cloud region 212 may include a set of protocol gateways 220, a set of managed cloud desktops 222, and a cloud service provider operational API 224. These components all communicate with the desktop service control plane 150. The cloud region 212 may support one of the fabric regions 132, 134, 136, and 138 in FIG. 1.

Such cloud regions include servers that host the various applications as well as appropriate storage capabilities, such as virtual disks, memory, and network devices. Thus, the cloud region 212 typically comprises IT infrastructure that is managed by IT personnel. The IT infrastructure may include servers, network infrastructure, memory devices, software including operating systems, and so on. If there is an issue related to an application reported by a user, the IT personnel can check the health of the infrastructure used by the application. A cloud region may include a firewall to control access to the applications hosted by the cloud region. The firewall enables computing devices behind the firewall to access the applications hosted by the cloud region, but prevents computing devices outside the firewall from directly accessing the applications. The firewall may allow devices outside the firewall to access the applications within the firewall using a virtual private network (VPN).

The protocol gateway 220 may be present to provide secure public or internal limited access to the managed virtual desktops, that may be deployed on a virtual machine of its own. A gateway agent 230 is software that is deployed on that gateway virtual machine by the desktop service control plane 150, and serves to monitor the activity on the gateway 220, and enable the desktop service control plane 150 to assist in configuration and operations management of the gateway 220.

The example desktop client 210 is software and device hardware available in the local environment of a desktop user 240 to remotely access a managed virtual desktop using a remote desktop protocol. The desktop client 210 communicates with the desktop service control plane 150 and also supports a remote display protocol in order for users to connect to a desktop application run by the cloud region 212.

The managed virtual desktop 222 is itself provisioned and maintained by the desktop service control plane 150. A desktop template may be used to manage pools of such managed virtual desktops. The desktop template is configured to provide remote access to the desktop client 210. A desktop agent such as desktop agent 232 is software that is deployed on that managed virtual desktop by the desktop service control plane 150, and serves to monitor the activity on the managed virtual desktop, and enable the desktop service control plane 150 to assist in configuration and operations management of the managed virtual desktop.

The cloud service provider operational application programming interface (API) 224 presents services provided by the cloud service provider that also participate in the management of the virtual machine. This can be utilized by a desktop service control plane 150 to perform operations like provisioning or de-provisioning the virtual machine.

Administrative users 242 can interact with operations reporting interface software at the administration center 214 that allows management and administration of the desktop service control plane 150.

Other components and services may interact with the desktop service control plane but are omitted from FIG. 2 for simplicity, such as enterprise connectors, network monitoring services, customer relationship management (CRM) systems, and many others.

The desktop service control plane 150 itself can perform many internal centralized functions also not depicted in in FIG. 2, including pool management, user and group management, cloud service adapters, virtual desktop templates, data analysis, high-availability management, mapping users to the optimal cloud region, security policy management, monitoring, compliance, reporting, and others.

The control plane 150 includes a user and group manager 250, a monitoring service 252, a flexible desktop management service (DMS) 254, an external API (EAPI) 256, and a configuration service (CS) 258. The control plane 150 may access an event data repository 270 and a configuration repository 272. Although only one cloud region 212 is shown in detail, it is to be understood that the control plane 150 may facilitate numerous cloud regions.

The monitoring service 252 makes both routine and error events available to administrators and can analyze operational performance and reliability. The monitoring service 252 interacts with components including the desktop client 210, desktop agent 230, gateway agent 232, and those generated by the control plane 150 itself. The flexible desktop management service 254 interacts with the one or more managed virtual machines (MVMs) 222 in the cloud region 212 and other regional cloud regions 212(1) to 212(N). In this example, the flexible desktop management service 254 manages resources for providing virtual desktops to the users in the pools, orchestrating the lifecycle of a logical desktop. As will be explained, multiple virtual desktops for the same logical desktop may be created by the flexible desktop management system 254 to ensure the virtual desktop accessed by a user operates optimally by changing the selection of the virtual desktop in response to changes in conditions. A desktop synchronization system 280 ensures that the state and data available to different virtual desktops used for the same logical desktop, managed by the flexible desktop management system 254, are synchronized. The goal of synchronization is to give the cloud desktop user a seamless experience when using one or another of the virtual desktops representing the logical desktop, without awareness that the underlying virtual desktops are not actually the same. In this example, the independent desktop synchronization service 280 does not communicate with the desktop service control plane 150 and orchestrates desktop state synchronization independently.

The administration center 214 works directly with the data control plane 150 as its primary human interface. The administration center 214 allows the administrative user 242 to configure the functions of the control plane 150 through the configuration service 258. The configuration service 258 supports editing and persistence of definitions about the desktop service, including subscription information and policies. The administration center 214 may be where the desktop requirement dimensions are configured by the administrative user 242.

The system 200 in FIG. 2 allows a flexible desktop concept to ensure maximum performance for a user. As will be explained, different sets of desktop resources are created that each may provide the desktop to a user. The example flexible desktop system allows a client device to access the desktop from any of the different sets of desktop resources.

Figure 3:
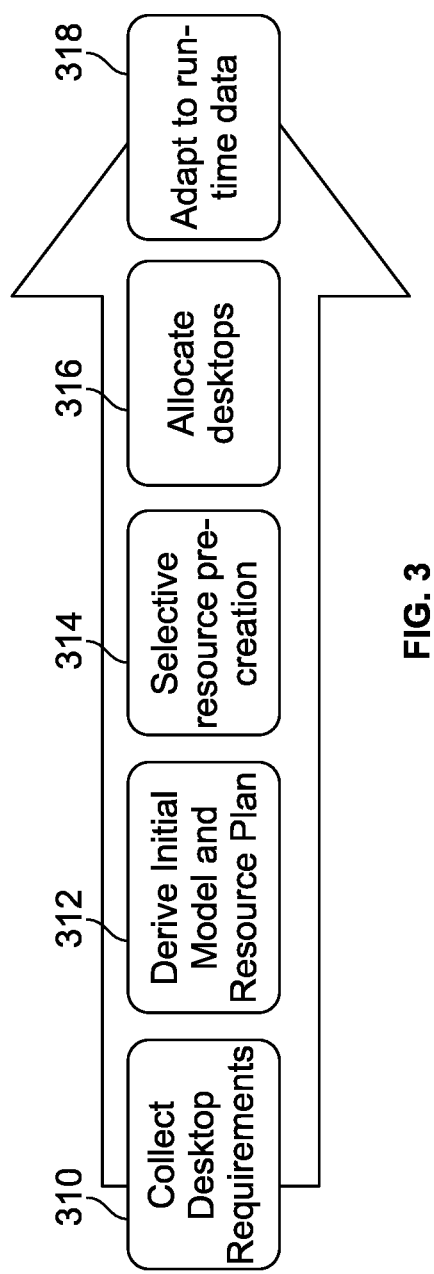
FIG. 3 is a flow diagram of the general process of desktop creation and assignment.

FIG. 3 shows a sequence of determining requirements for providing a virtual desktop to a user in a logical pool via the flexible desktop system 254 using cloud regions such as the cloud region 212 in FIG. 2. The desktop requirements for the user are first collected (310). An initial model for multi-cloud desktop and a resource plan are derived based on the collected desktop requirements (312). Selected resources may be pre-created for one or more desktops in one or more cloud regions (314). Virtual desktops may then be instantiated from the different sets of desktop resources for the user (316). The specific resources that provide the virtual desktop may be adapted to run-time conditions (318), possibly changing the priority order of access, and/or allowing another virtual desktop to be accessed to provide the desktop, a process that will not interrupt the perceived operation of the logical desktop. The sequence in FIG. 3 may be repeated as conditions change.

In the collection of requirements 310, multi-cloud desktop requirement dimensions are collected by an administrative user 242 as configuration data, including but not limited to: user locations, required desktop capabilities, cost constraints, billing rate plan constraints, usability (measured in initial and subsequent response time), and reliability (measured in predicted uptime and levels of redundancy in case of failure). FIG. 4A shows a table 410 of an example set of requirement dimensions for a multi-cloud desktop. The example dimensions in the table 410 include a user location requirement 412, a set of desktop capability requirements 414, a cost constraint requirement 416, a billing constraint requirement 418, a response time requirement 420 and a reliability requirement 422. In this example, the user location requirement 412 is the physical location of the desktop user or a concentration of desktop users. The desktop capabilities requirement 414 may include processing capabilities (e.g., CPU type), storage capabilities (e.g., memory size, disk class, disk size), and operating system. The desktop capabilities are thus those that are defined by the requirements of the users in the particular logical pool such as those who need access to a sales desktop. Such requirements may differ from other types of desktops such as an engineering desktop. The cost constraint requirement 416 can be used by the system to differentiate between similar services that vary in underlying cost. For example, some cloud regions charge a higher price than others for the same resource and the cost constraint can be used as input in planning the prioritized order of cloud region selection. Similarly, the billing constraint 418 indicates preferences for certain types of billing plans, as some resources may be available with billing plans that more attractive than others. For example, some resources may be more flexible as they are billed for usage by the second, while others are billed a flat usage fee for a longer period of time. The response time requirement 420 includes the initial response time (affecting the experience of waiting to connect to a new session) and the subsequent response time (affecting the perception of user interaction lag) of the desktop system. The reliability requirement 422 includes a predicted uptime and the level of redundancy. In this example, the level of redundancy indicates how many desktop resources would have to fail before the end user experiences the failure. For example, with a level of redundancy of 3, the user would have a primary virtual desktop, a secondary backup virtual desktop, and a tertiary backup virtual desktop. All of the virtual desktops are exclusively assigned to the user. All three would have to fail for the user to experience an outage of availability of their desktop. A high level of redundancy provides more reliability, at higher cost.

A second table 450 shows an example set of collected requirement values. In this example, the user location requirement 412 is Tokyo, Japan. The desktop capability requirement 414 is 4 cores, 16 GB memory, high performance disk class, 256 GB disk size, and Windows 11 operating system. The cost constraint requirement 416 is $1000 for the example user. The billing constraint 418 is hourly billing. The response time requirement 420 includes the initial response time of 38 ms and the subsequent response time of 16 ms. The reliability requirement 422 includes a predicted uptime of 99.95% and a 3 level of redundancy as explained above.

Returning to FIG. 3, an initial model is derived from the determined requirements (312) by the flexible desktop management system 254 and stored in the configuration repository 272 by the configuration service 258. The initial model utilizes historical data from users with similar requirements (including data from other customers) stored in the event repository 270 by the monitoring service 252, and data from cloud service providers (e.g., region availability, costs, quality of service, rate plans). The model may include configurable weighting factors that indicate the relative importance of requirements. This results in a plan for which clouds and which regions best serve the requirements, which resources should be pre-created, and which resources will be created on demand. The highest priority desktop is the desktop resource set that is the most optimal in multiple dimensions derived from requirements. For example, the requirements of user experience and cost may define the prioritization. For example, there may be historical data that indicates various insights about a user: perhaps the user typically connects from an endpoint located in the New York City metropolitan area. There may be two cloud regions that provide the required latency, quality of service, and rate plans to satisfy the requirements generally, but at varying costs. Assuming a redundancy requirement of 3, the process can implement a strategy that selects two sets of desktop resources that will span cloud service providers (to provide resiliency in the event of cloud service provider failure), and one additional set out of the area (to provide resiliency from regional disaster). Furthermore, the list of three desktop resource sets will be ordered to optimize for cost. By matching the requirements with the cloud region constraints, the process can determine an optimal priority order for the desktop resource sets.

Figure 4B:
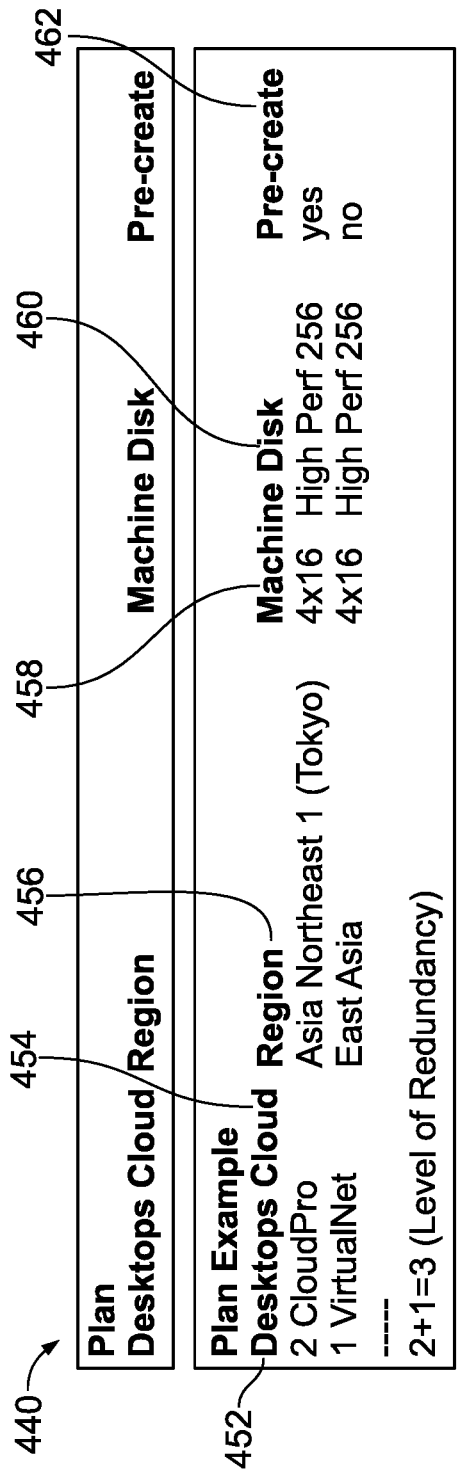
FIG. 4B is an example plan for creation of a virtual desktop according to the requirements of FIG. 4A.
Figure 4A:
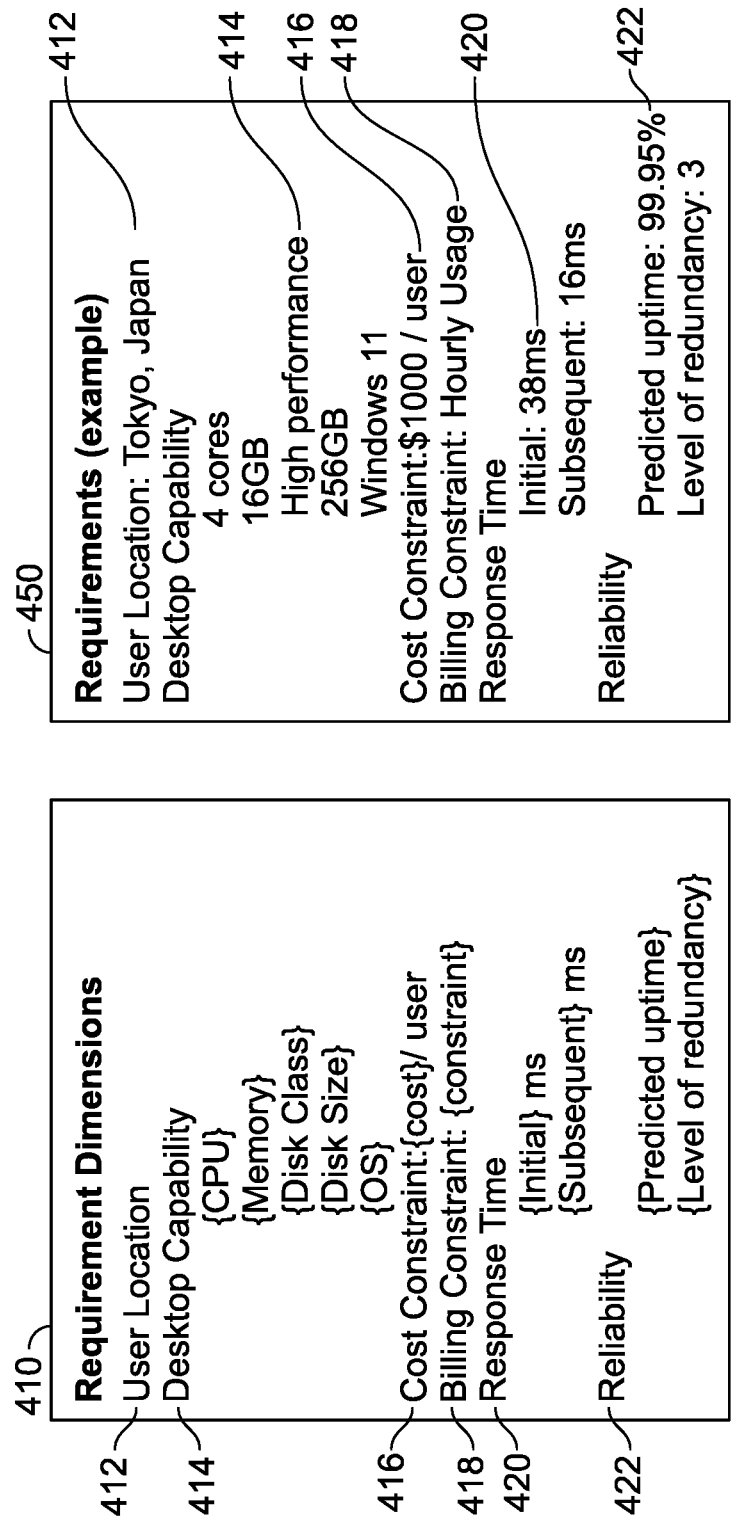
FIG. 4A is a table of example requirements for an example logical desktop and example values for the requirements.

FIG. 4B shows an example model template 440 that is created from the plan. The model template 440 includes a number of desktop resources entry 452, a cloud name entry 454, a region description entry 456, a machine type entry 458, a disk type entry 460 and whether the resource is pre-created entry 462. Thus, the number of desktops entry 452 is the number of desktops for each of the cloud regions. The cloud name entry 454 and a region description entry 456 list the cloud name and region name. Thus, in this example the user has three possible virtual desktops that may support the logical desktop accessed by the user operated client device. The machine type entry 458 in this example is four cores at 16 GB according to the requirements in the table 450 in FIG. 4B. The disk type is a high performance 256 GB according to the requirements in the table 450 in FIG. 4B.

Certain required desktop resources for virtual desktops are selectively pre-created based on an entry in the pre-creation column 462. Thus, in this example, the two desktop resources from the Asia Northeast region are pre-created by the fictional cloud service provider CloudPro, while the desktop resources from another fictional cloud service provider, VirtualNet, as associated with that cloud service provider's East Asia region but is not pre-created. In this example, it is also possible that the cloud service provider CloudPro will automatically provision the two logical desktops in two different availability zones within Asia Northeast 1 (Tokyo) to increase the availability in the event of a failure, as some cloud service providers may fail, or, the desktop service control plane 150 may use multiple availability zones automatically. The cloud resources may include cloud subscriptions, networks, protocol gateways, and the provisioning of virtual machines to serve as the listed virtual desktops. In this example, a primary, secondary, and tertiary virtual desktop can be created in multiple clouds and/or multiple regions for each user. Each virtual desktop is provisioned, when needed, using the same virtual machine template and is functionally equivalent and equally capable of satisfying the requirements for that user, so that which desktop is used at any moment is not apparent to the user. Desktop resources that are not pre-created may be created on demand.

In order for the user not to be impacted by a switch to a functionally equivalent virtual desktop, the data accessed by the desktop must be the same also, including persistent data storage, registry and other configuration settings, user profile and other personalization, and any other information. A mechanism for synching the state of desktops is a known technique that is preconfigured, and may be delegated to the third-party desktop synchronization system 280.

Figures 5, 6:
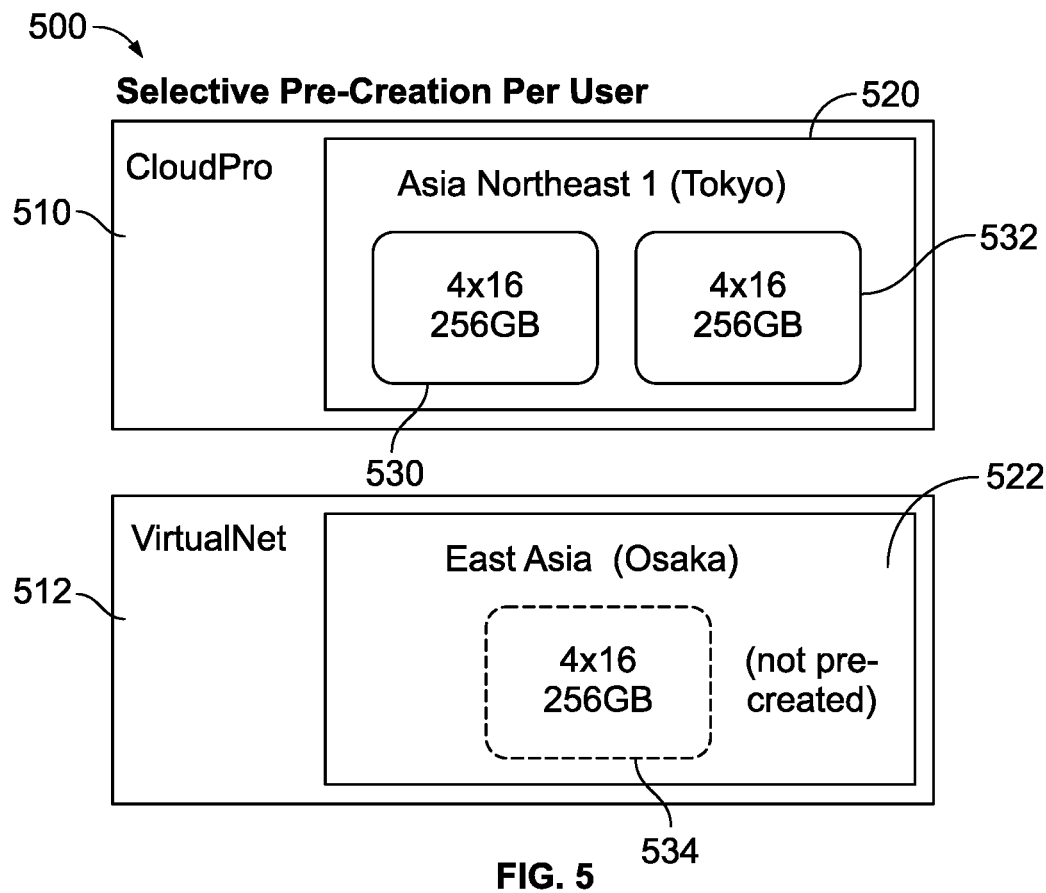
FIG. 5 is a diagram showing selective pre-creation of a virtual desktop for a user.
FIG. 6 is an assignment of a prioritized list of virtual desktops.

FIG. 5 shows an example implementation of the plan shown in FIG. 4B with certain selective pre-creation of desktop resources for the three virtual desktops exclusively associated with a given user. The implementation 500 has two cloud regions 510 and 512. Each of the regions 510 and 512 have a corresponding cloud region 520 and 522. According to the plan in FIG. 4B, two sets of desktop resources 530 and 532 are pre-created in the form of two virtual machines and associated virtual storage devices, in the cloud region provided by the fictional cloud service provider "CloudPro" 520. In this example, both virtual machines are provisioned with the required number of cores, RAM, and persistent disk storage called for in the plan. For the purposes of this invention, it does not matter how many hosts are used to implement the virtual machines; that is a detail implemented by the cloud service provider. If possible, when resources are pre-created but are not actively used, they will be kept in a lower cost state such as pause, hibernate, or powered down, depending on the capabilities of the cloud service provider. In this example, the other cloud region provided by the fictional cloud service provider "VirtualNet" 522 does not have a pre-created set of resources for a desktop. A set of desktop resources 534 is thus created on demand in the other cloud region 522 as will be explained below. Of course, there may be more desktops, and cloud regions in accordance with the model.

A prioritized list of interchangeable virtual desktops including a set of resources that can each generate a virtual desktop is allocated to a user based on requirements in the example system 200 in FIG. 2. The user is only aware of a single logical desktop to launch and is unaware of the dynamic prioritized list of interchangeable virtual desktops.

FIG. 6 shows an example prioritized assignment list 600 of desktops for a user in accordance with example implementation in FIG. 5. In this example, the desktops in the assignment list 600 are ordered by the model described above. The highest priority desktop resource set is that which is considered the most optimal in multiple dimensions derived from requirements, the next desktop resource set is the next most optimal, and so forth. For example, if latency and cost were configured to be the most important attributes, and the cloud region from CloudPro has lower latency and cost than the cloud region from VirtualNet, the CloudPro desktops will be in the highest priority position on the list. Thus, the example model includes the prioritized list to optimize matching a desktop with the user's requirements while still providing fail over for high availability. It does this through some logic that considers the values (which may be weighted) based on a scoring system. The assignment table 600 includes a user identification column 610, a logical name of the associated desktop column 612, a priority rank column 616 of the desktop, and a desktop identification column 618. Thus, the sets of desktop resources for the user are listed in order of the priority rank in the column 616; in this example format, lower priority numeric values have precedence over higher priority numeric values.

The prioritized list 600 has interchangeable desktop resources for a hypothetical user identified here as "0006"

shown in the rows under the user identification column 610 connecting to the logical desktop name "Sales Desktop" in the logical name column 612. The example virtual desktop names in the column 618 for each of the listed desktops illustrate that the desktops are specific to a cloud region as shown in FIG. 5. For example, the first and second priority desktops are supported by the cloud region 510 and corresponding cloud region 520 in FIG. 5.

Figure 7:
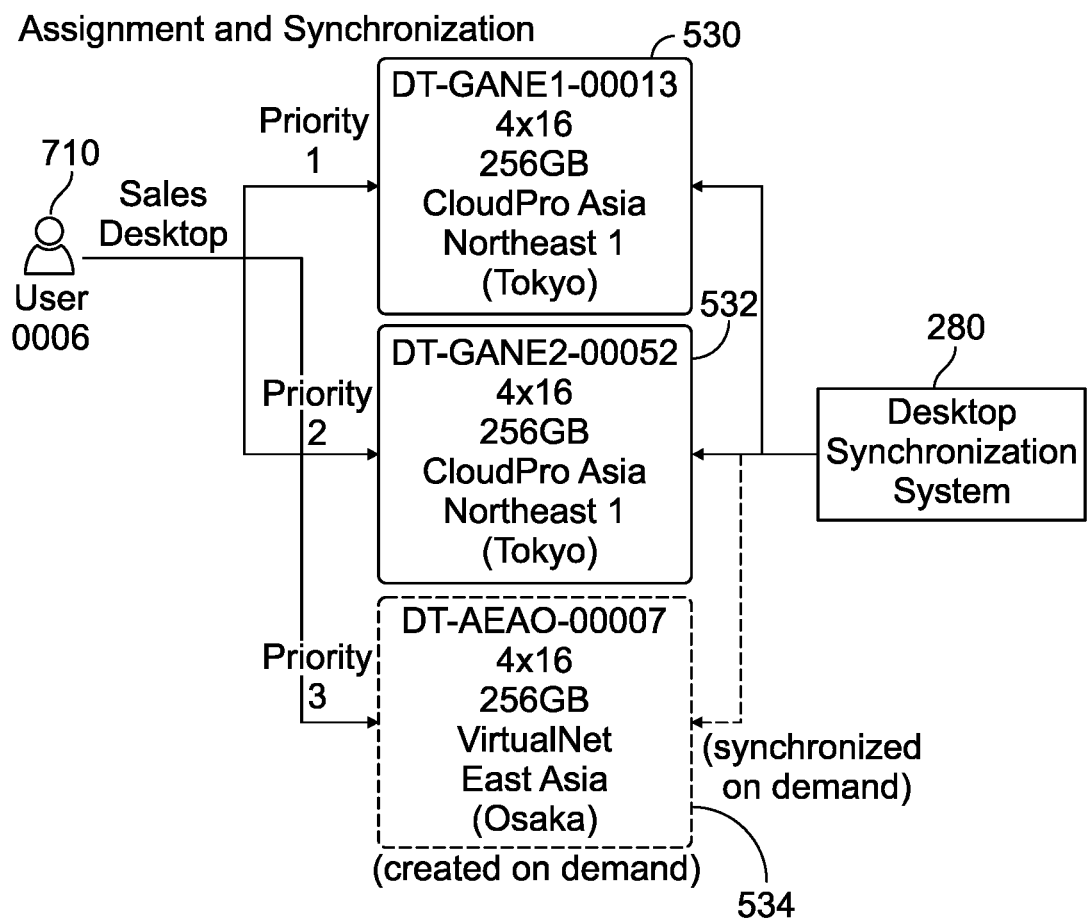
FIG. 7 is a diagram showing the priority process for an example logical desktop.

As the desktop resources are used, the system adapts to run-time data which includes but is not limited to: user location, performance, and operational status. FIG. 7 shows an example user 710 and the different desktop resources 530, 532, and 534 that are available according to the plan in FIG. 4B and implementation in FIG. 5. As shown in FIG. 7, each of the desktop resources 530, 532, and 534 are prioritized according to the priority list in FIG. 6. The desktop synchronization system 280 ensures the user sees the same desktop state, personalization, persistent files, and so on regardless of the desktop resources 530, 532, and 534 selected. As described previously, the desktop synchronization system 280 must exist but may be implemented directly by the flexible desktop management service 254 of the control plane 150 in FIG. 2. However, it may also be implemented as an independent third-party service, such as a device management service. A commercial example of a system capable of performing this synchronization is Microsoft InTune but there are many alternatives including either custom-built solutions or generally available solutions. The implementation of the desktop synchronization system ensures that all the data relevant to the desktop user is kept automatically synchronized between the interchangeable desktops.

FIG. 7 illustrates that the three interchangeable desktop resources 530, 532, and 534 are available exclusively to the example user 710 connecting to a "Sales Desktop." The desktop resources 530, 532, and 534 are kept synchronized by the desktop synchronization system 280.

There may be a series of scenarios in real-time that allow the user 710 to seamlessly be switched to different desktops. In a normal scenario, the user will always connect to the highest priority desktop resource implementing the logical desktop name. In this example shown in FIG. 7, the user 710 would generally be connected to the desktop generated by the desktop resources 530 named "DT-GANE1-00013" in the cloud region "CloudPro Asia Northeast 1 (Tokyo)" 510 as shown in the first row in FIG. 6 since this desktop resource is the highest priority.

Figure 8A:
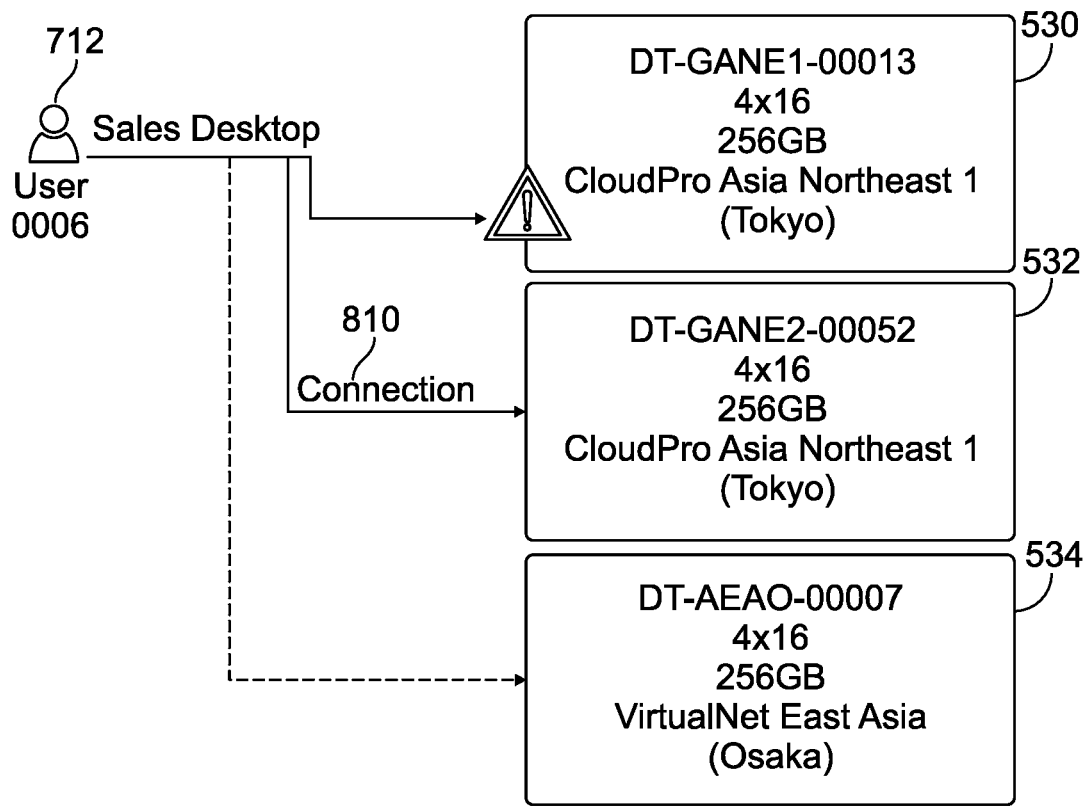
FIG. 8A shows a first scenario requiring reassignment of resources for supporting the virtual desktop.

FIG. 8A shows an example of an abnormal scenario where a desktop resource fails and thus is unavailable to the user 710. The example flexible desktop management system may adapt based on run-time to ensure continuous desktop service for the user 710 in FIG. 7. In this example, the first desktop resource 530 in the prioritized list has failed as shown in a table 800. The system will automatically attempt to connect (810) the user 710 with the next desktop resource in the prioritized list. In this example, the second priority desktop is the desktop resource 532 with the virtual desktop name "DT-GANE2-0052." If that desktop resource also has failed, the next desktop resource in the priority list such as the third desktop resource 534 with the virtual desktop name "DT-AEAO-0007" would be used. In this example, the second priority desktop resource 532 is pre-created and thus resources are reserved. However, if necessary, and supported by the cloud service provider, the definition configuration information stored in the flexible desktop management system 254 for a desktop resource may create any virtual desktop on demand and then connect the user to the desktop resource to generate the virtual desktop. Thus, where the third priority desktop resource 534 is required, the flexible desktop management system 254 creates the third desktop resource 534 with the virtual desktop name "DT-AEAO-0007" in the assigned cloud region. The desktop operated by the user is thus executed by the newly created desktop resource 534. The flexible desktop management system may determine that an additional cloud region is required to support additional virtual desktops, and may instantiate the required cloud infrastructure on demand, including for example a cloud subscription, virtual network, storage and other resources, one or more remote desktop protocol gateways, and the like. Creating resources dynamically, as shown in this example, may improve the effectiveness of the desktop resources but is not necessary for the system to work as all resources may also be pre-created if needed.

Figure 8B:
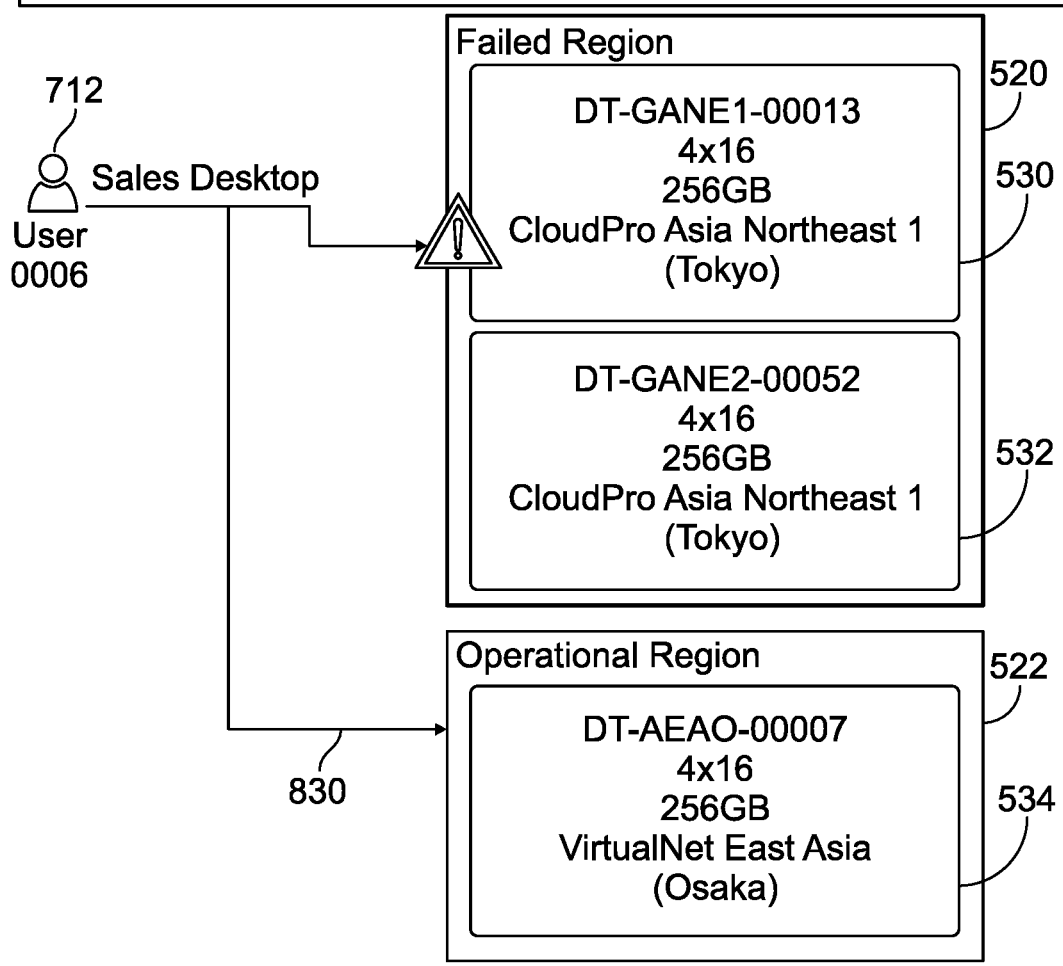
FIG. 8B shows a second scenario requiring reassignment of resources for supporting the virtual desktop.

FIG. 8B shows an example scenario where an entire cloud region, such as the cloud region 520 in FIG. 5, fails. FIG. 8B shows a similar scenario as that shown in FIG. 8A, except that in this case, an individual desktop did not fail; rather, an entire cloud region 520 has failed or is inaccessible. Both the first and second priority desktop resources 532 and 534 in this example are supported by the cloud region 520 and thus both fail in this scenario as shown in a table 820. Because the flexible virtual desktop system supports multiple clouds, the user is still able to connect (830) to a working desktop generated through the third priority desktop resource 534 provisioned in the different cloud region 522 that is still operational.

Figure 8C:
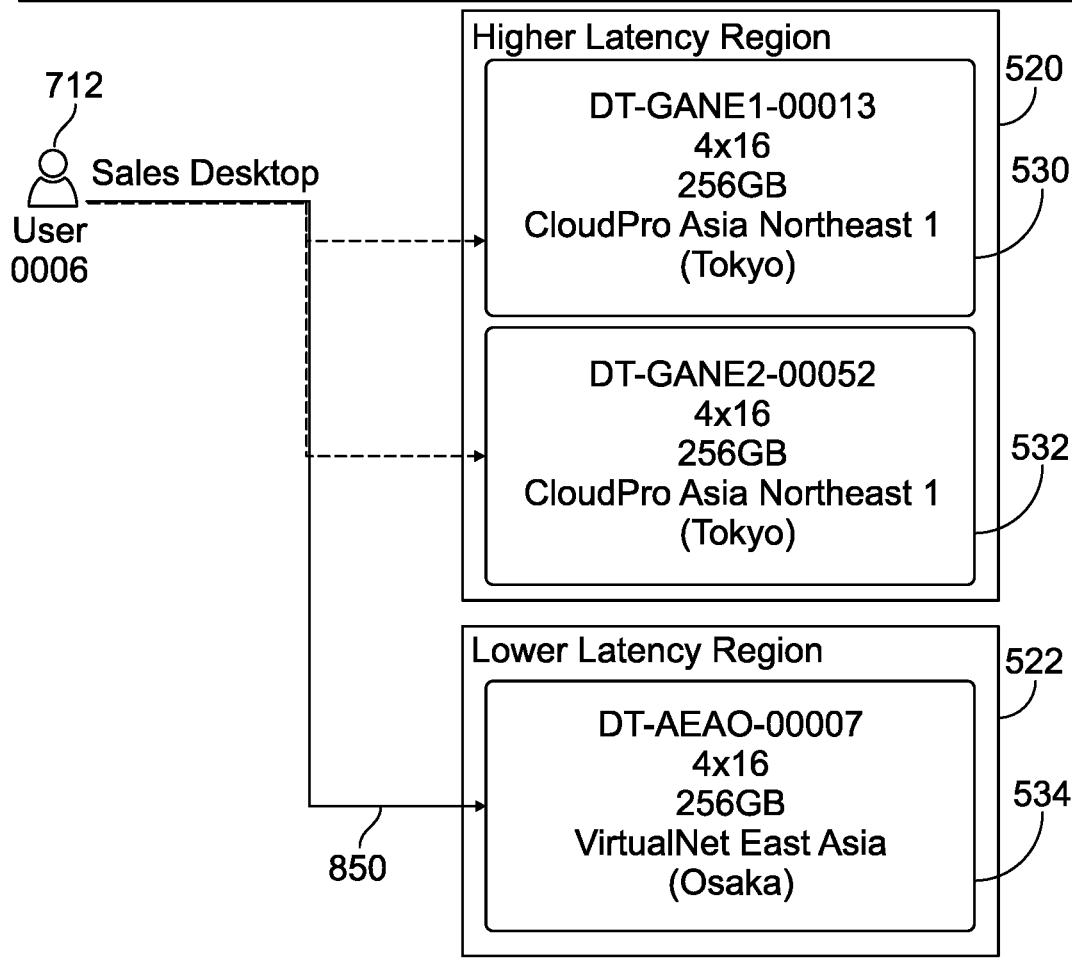
FIG. 8C shows a third scenario requiring reassignment of resources for supporting the virtual desktop.

FIG. 8C shows another example of how run-time data can be used to ensure optimal desktop availability to the user 710. Based on dynamic network conditions, the prioritized list of desktop resources for providing a desktop can be adjusted to take advantage of traffic conditions on virtual networks. FIG. 8C shows a network condition table 840. In this example, the desktop resource of the lower latency region can be given the highest priority, and thus when the user 710 connects to "Sales Desktop", the lowest-latency experience is delivered as the lowest latency virtual desktop is selected to provide the Sales Desktop. In this example, the flexible desktop system determines latency for the virtual desktops 530, 532, and 534. The flexible desktop system thus dynamically reorders the priority based on lowest latency, and thus, the virtual desktop 534 is now the first priority desktop as the virtual desktops 530 and 532 have higher latency, possibly from the cloud region 520. Thus, the system connects (850) the user 710 to the virtual desktop 534 for the lowest latency.

The following is an example illustration of one implementation's configuration model illustrating how a logical desktop can be provided and managed and how a user of one logical desktop can be dynamically connected to one of several virtual desktops. For purposes of illustration, a known implementation of managing a pool of desktops by the system 200 in FIG. 2 is shown in FIGS. 9A-9B. The present disclosure enhances the known implementation for provision of a virtual desktop to support the flexible provisioning of the desktops.

In FIG. 9A, a classic configuration model 900 for provisioning a cloud desktop is depicted. A group 910 of users 912 is maintained by the desktop service control plane 150. Each group of users 910 may be associated with one or more pools 914 located in a specific cloud region 916 such as one of the cloud regions in FIG. 5. Within the pool 914, there is the configuration of one more virtual desktops 918, each of which may be assigned to a specific user. Each of the virtual desktops in the desktops 918 have associated resources that are provided by one of the cloud regions. The user 912 can launch the assigned virtual desktop 918 by clicking on an icon representing the pool 914 from an application on a user device.

FIG. 9B shows an example of the configuration model 900 that may exist for a particular user John Smith 922 with user ID 0006. As part of the "Pacific Sales Group" 920, this user 922 is associated with the Pool "NE Asia Sales Pool" 924. The pool 924 is supported by the cloud region CloudPro East Asia 1 926. A virtual desktop "DT-GANE1-00013" 928 is already provisioned and assigned to user 0006. When the user John Smith 922 clicks on the icon for "NE Asia Sales Pool" 924 on a user device, he or she is connected to the virtual desktop "DT-GANE1-00013" 928. As explained previously, the disadvantage of the classic provisioning model is that if the desktop or cloud region fails, the user cannot access the desktop as the resources to provision the virtual desktop are not operational.

Figure 10A:
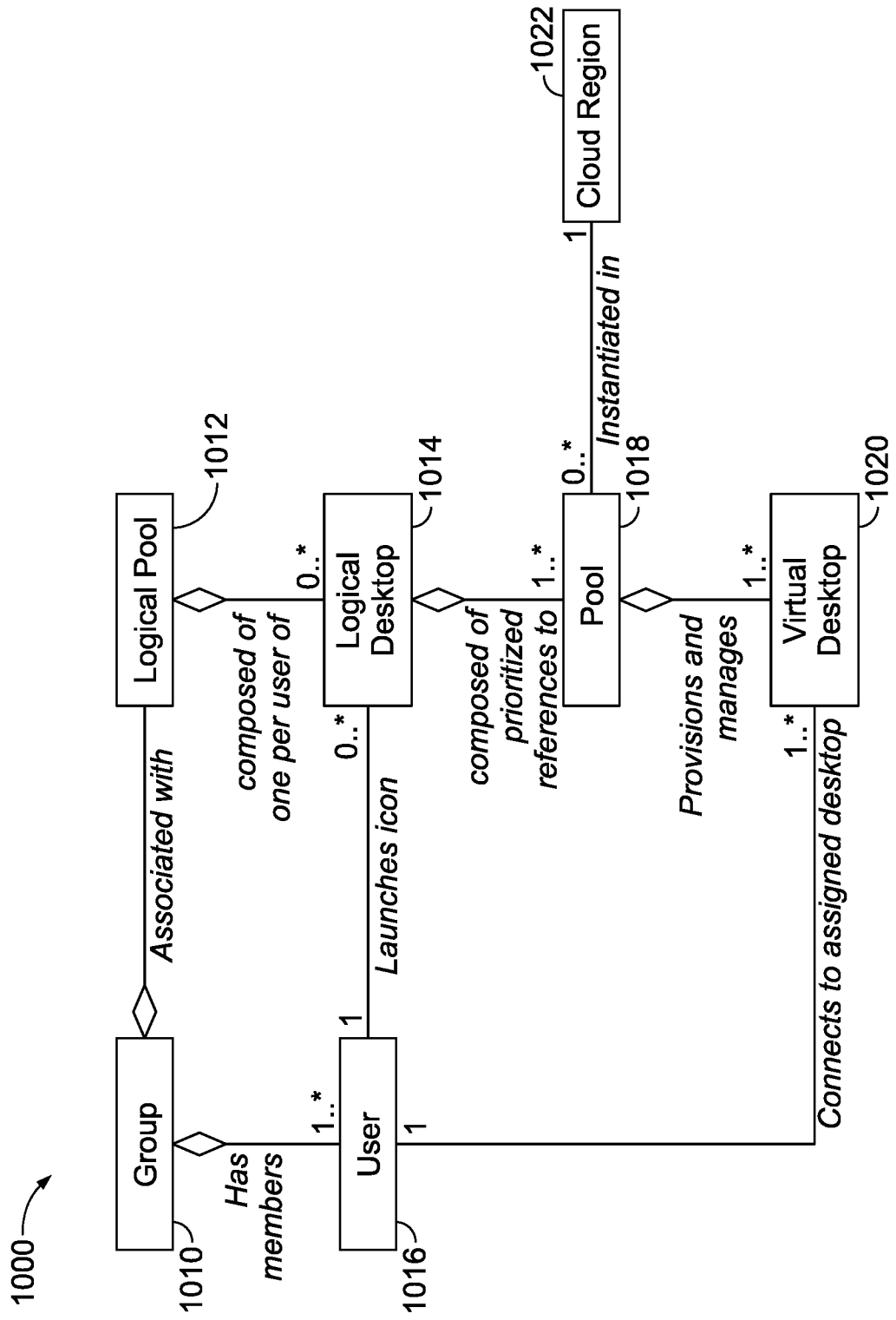
FIG. 10A is a generic block diagram of the example model of object relations using multiple desktop resources.

FIG. 10A shows an enhanced relationship model 1000 to support the use of the flexible virtual desktop system described above. In the enhanced model 1000, one or more groups 1010 are associated with a logical pool configuration object 1012. Thus, each group of the series of groups 1010 may be associated with a configuration object known as a logical pool. The logical pool configuration object 1012 contains some of the same information used to configure a pool in the last example, but leaves out information about a specific cloud region. Instead, the logical pool configuration object 1012 maintains a collection of logical desktop configuration objects 1014. Each of the logical desktop configuration objects 1014 is associated with a user 1016, and contains a prioritized list of pools 1018. Each pool configuration of the list of pools 1018 includes at least one logical desktop configuration 1020 that may be associated with a specific user indirectly, by means of the logical desktop 1014. As in the example in FIG. 9A, the pool maintains information about a logical desktop that may be instantiated in a cloud region 1022 using virtual desktop resources of that region. There are now multiple virtual desktops available for the user to connect to one distinct virtual desktop out of many virtual desktops, though the relationship to the virtual desktop is maintained in the logical desktop abstraction.

Figure 10B:
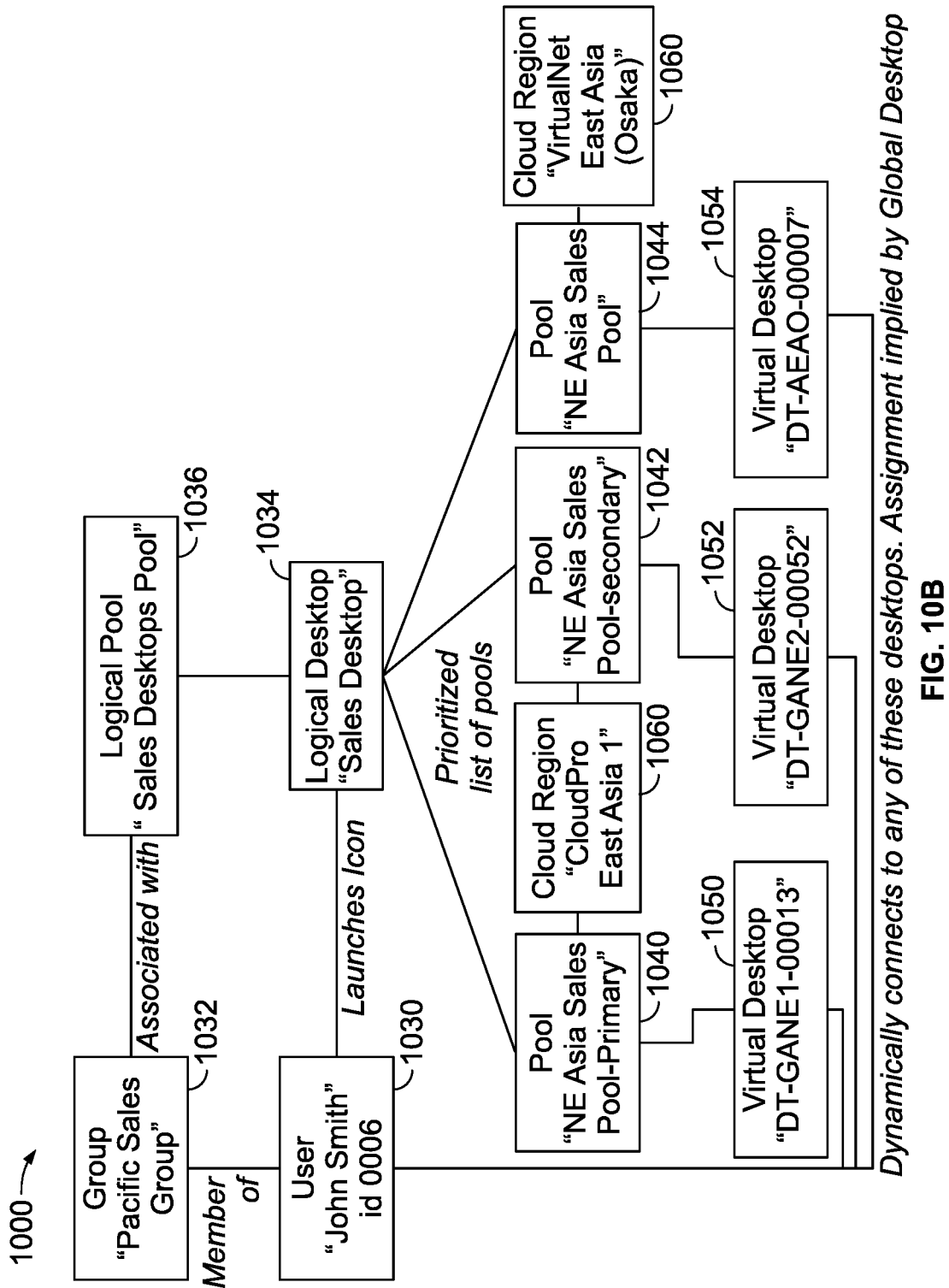
FIG. 10B is a specific example of the example model of object relations of providing desktops in FIG. 10A.

FIG. 10B shows an example of the application of the model 1000 in FIG. 10A in the context of one particular user 1030 (John Smith with ID 0006), who is a member of a user group (Pacific Sales Group) 1032. In this example, the user "John Smith" 1030 can launch a logical desktop 1034 by clicking on an icon 1036 for "Sales Desktop." Unlike the example above in FIG. 9A, there could be multiple pools providing virtual desktops. Thus, in this example, a "NE Asia Sales Pool—Primary" pool 1040, a "NE Asia Sales pool—Secondary" 1042, and a "NE Asia Sales Pool" 1044 are available. These pool configurations can be pre-created according to the plan such as the plan in FIG. 4B, or can be dynamically created on demand. In this example, the first two Pool configurations indicate that virtual desktop resources 1050 and 1052 are hosted in a first Cloud Region 1060 designated "CloudPro East Asia 1." The third Pool configuration indicates that Desktops such as a virtual desktop 1054 are hosted in a second Cloud Region 1062 designated "VirtualNet East Asia (Osaka)." The user John Smith 1030 can now connect to one of the three possible virtual desktop resources 1050, 1052, or 1054 available without knowing which actual virtual desktop resource is used. The desktop service control plane 150 provides configurations so that the decision about which virtual desktop resource to dynamically assign to John Smith can be determined close to the time of the invocation of the logical desktop launch, and therefore can allow optimization of the virtual desktop resource selection based on dynamic conditions such as lowest latency, availability, and cost.

In one example, the client software run by the user to launch and interact with the logical desktop may have logic to allow selection of one of multiple virtual desktops. In this example, the policy and prioritized list of virtual desktops is made available to the client software which can then operate independently of the cloud desktop system. Alternatively, the client software performs a redirection of the virtual desktop by interacting with the cloud desktop system whenever the logical desktop is invoked by the user.

Figure 11:
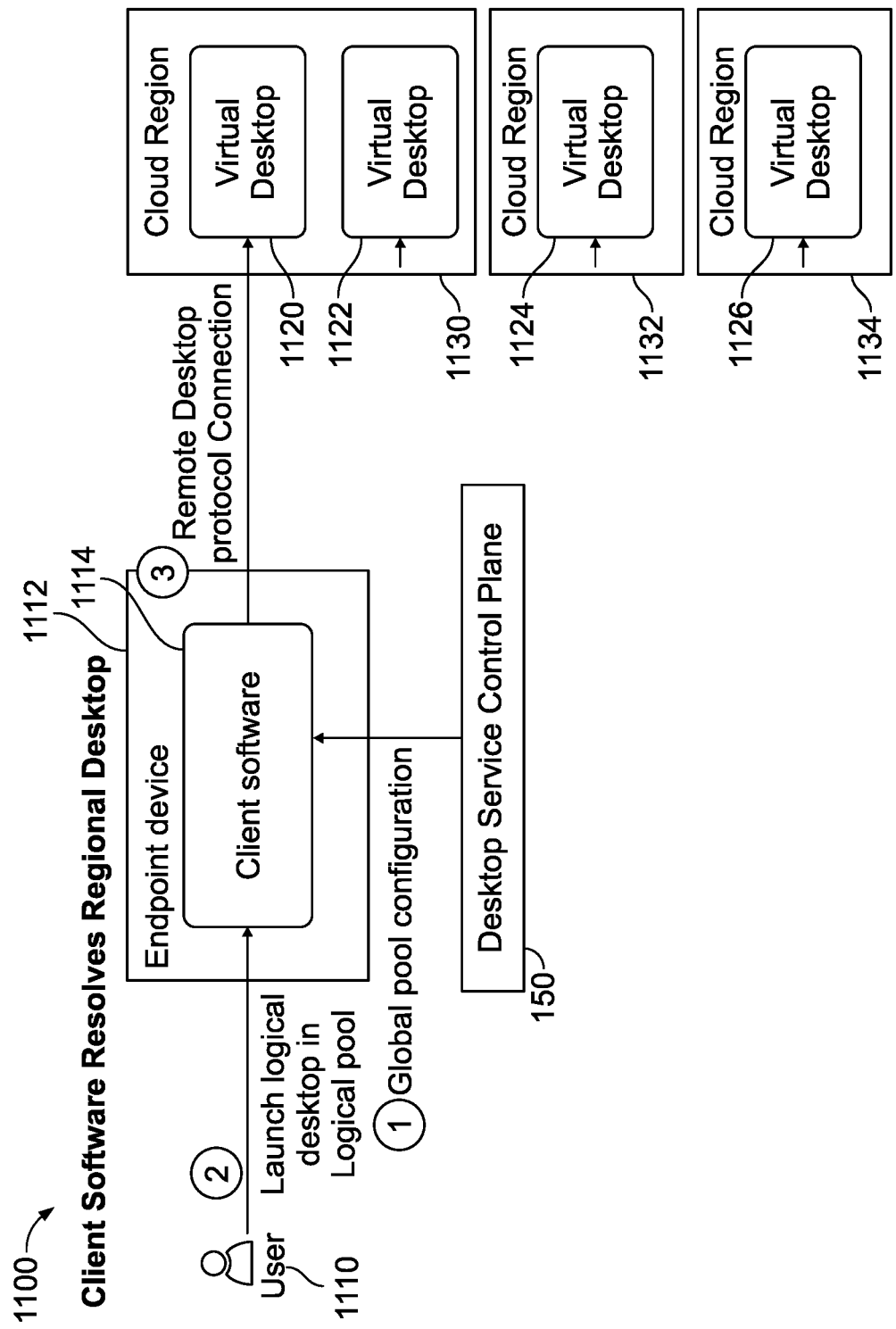
FIG. 11 is a logic diagram of the provision of virtual desktops from a prioritized list of virtual desktops.

There are many ways that the client software running on the endpoint can connect to the appropriate virtual desktops by interacting with the desktop service control plane 150. FIG. 11 shows one possible embodiment of the logic between a user 1110 that launches a logical desktop in an endpoint device 1112. The endpoint device 1112 includes client software 1114 to allow access to the cloud desktop system. In this scenario, in Step 1, the desktop service control plane 150 previously makes configuration information about the prioritized list of virtual desktops available to the client software 1114 running on the endpoint device 1112 operated by a user 1110.

In Step 2, the user 1110 launches a logical desktop in a logical pool by clicking on the single icon displayed on the endpoint device 1112. The icon represents the logical name of the desktop. In Step 3, the client software 1114 running on the endpoint device 1112 uses the configuration information provided earlier to create the connection to the specific virtual desktops in a cloud region based on the prioritization. In this example, a virtual desktop resource 1120 is accessed from a cloud region 1130. Another virtual desktop resource 1122 could be accessed from the cloud region 1130.

Alternatively, the client software 1114 may change to other virtual desktops in the original cloud region such as the virtual desktop 1122 or other virtual desktops 1124 and 1126 in other cloud regions 1132 and 1134 depending on dynamic conditions.

Figure 12:
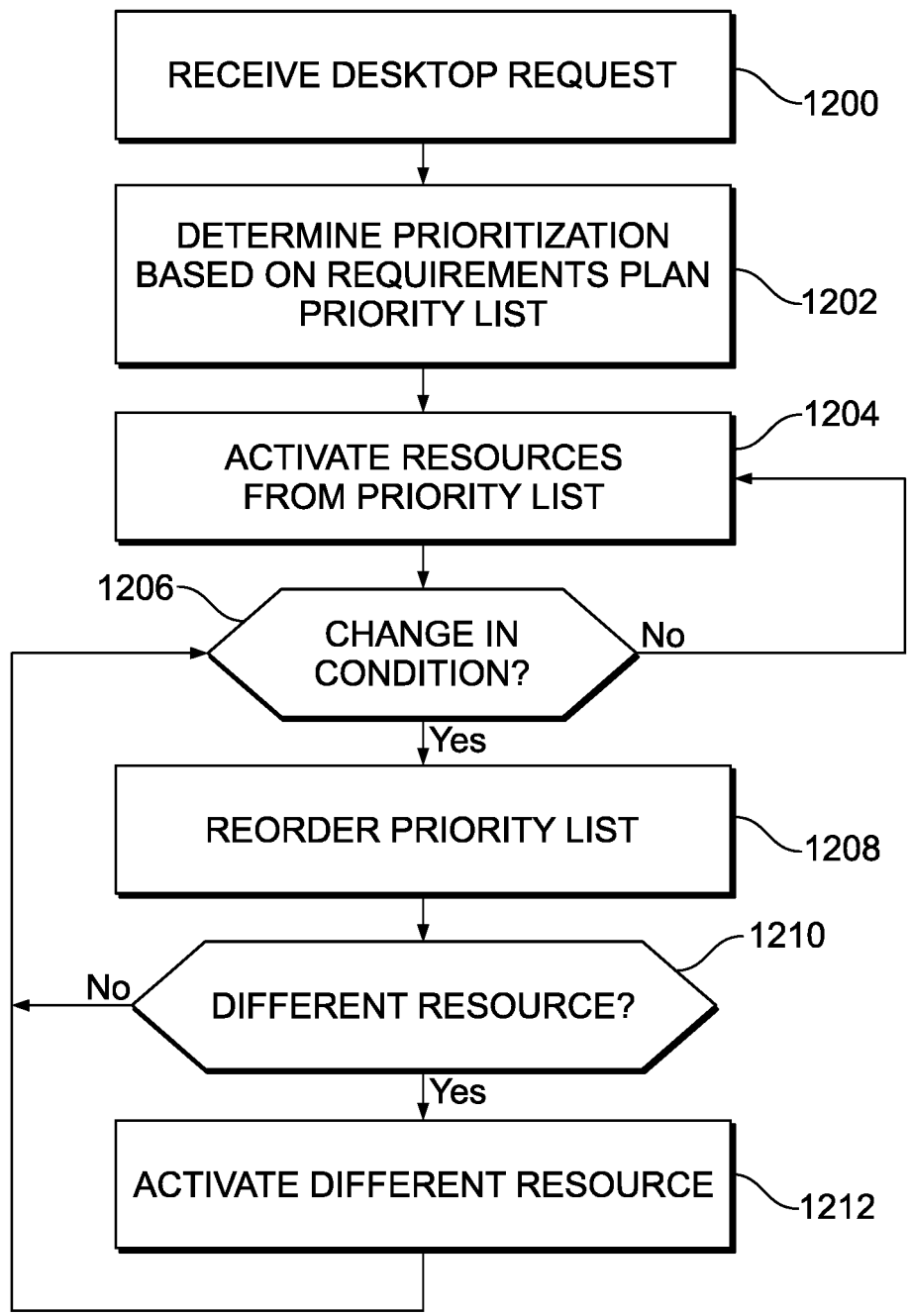
FIG. 12 is a flow diagram of the routine of providing virtual desktop resources using a priority list.

FIG. 12 is a flow diagram of the routine to enable a logical desktop. The flow diagram in FIG. 12 is representative of example machine readable instructions for the process of prioritizing desktop resources and making a desktop available to a user based on the prioritization. In this example, the machine readable instructions comprise an algorithm for execution by: (a) a processor, (b) a controller, and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIG. 12, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The routine first receives a request from a client device for a desktop for a user (1200). The routine then determines the prioritization of all of the desktop resources that can provide the desktop based on the previously determined requirements and model (1202). The routine then activates the top priority desktop resource to provide the desktop to the user (1204).

During operation of the desktop, the routine periodically determines whether relevant conditions such as latency, availability of a cloud region, or location has changed (1206). If no conditions have changed, the routine continues use of the desktop resources. If a condition has changed, the routine reorders the priority list according to the changed condition (1208). The routine then determines whether a different desktop resource is optimal given the changed condition (1210). If the same desktop resource is optimal, the routine continues operation via the desktop resource. If a different desktop resource is optimal, the routine activates the different desktop resource according to the revised priority list (1212). As explained above, if the desktop resource is pre-created, the routine accesses the resource. If the desktop resource is not pre-created, the routine creates the desktop resource and then activates the created desktop resource. Once the new desktop resource is activated, the routine returns to monitoring system operation.

The above described flexible virtual desktop system addresses the need for providing reliable multi-cloud desktops in an optimal fashion as defined by requirements, such as user experience and cost. Operators of virtual desktop systems lose productivity when users cannot access their primary virtual desktop because of issues out of their control. By providing availability of multiple desktop resources, the system addresses the desktop availability caused by cross cloud/cross regional issues. The system automatically provides the optimal choice of cloud and region to avoid unnecessary costs or lack of availability of virtual resources, based on changing conditions.

The multiple available desktop resources provided by the flexible virtual desktop system insures a user is always guaranteed access to a desktop anytime and from any location in an optimal fashion as defined by desired requirements. A user connecting to a desktop via a client device is completely seamless, is optimized for user experience, and happens without the knowledge of the user.

Figure 13:
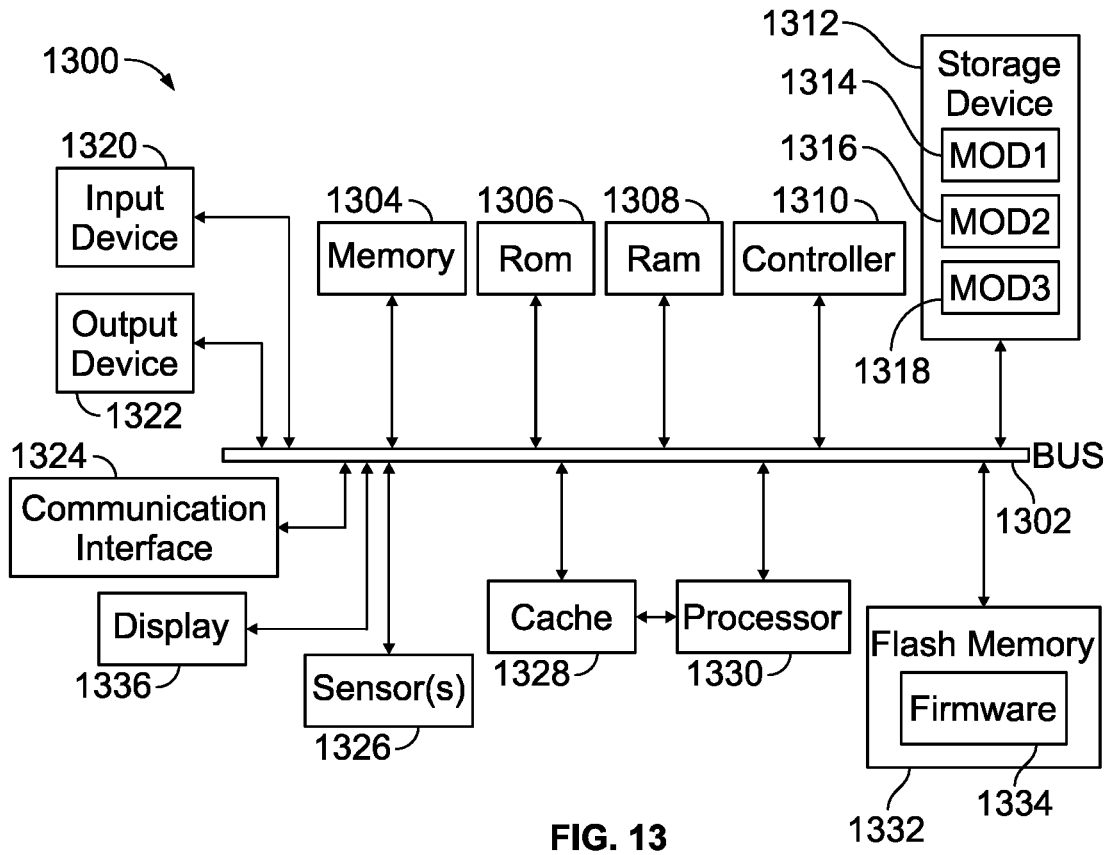
FIGS. 13 and 14 illustrate exemplary systems in accordance with various examples of the present disclosure.
Figure 14:
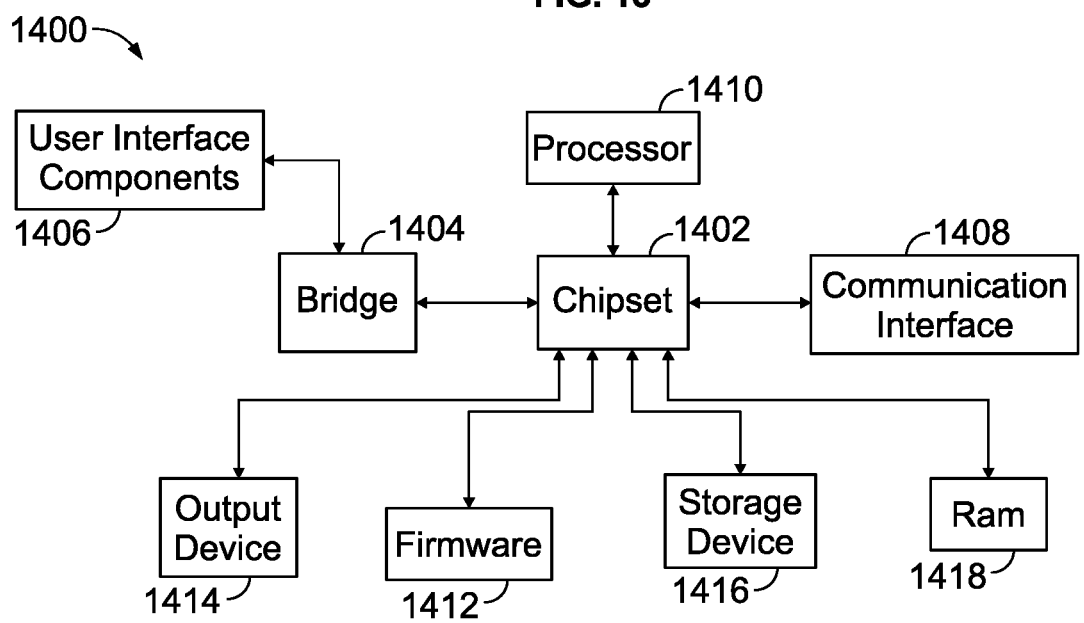

FIGS. 13-14 illustrate an example computing system 1300, in which the components of the computing system are in electrical communication with each other using a bus 1302. The system 1300 includes a processing unit (CPU or processor) 1330 and a system bus 1302 that couple various system components, including the system memory 1304 (e.g., read only memory (ROM) 1306 and random access memory (RAM) 1308), to the processor 1330. The system 1300 can include a cache of high-speed memory connected directly with, in close proximity to, or integrated as part of the processor 1330. The system 1300 can copy data from the memory 1304 and/or the storage device 1312 to the cache 1328 for quick access by the processor 1330. In this way, the cache can provide a performance boost for processor 1330 while waiting for data. These and other modules can control or be configured to control the processor 1330 to perform various actions. Other system memory 1304 may be available for use as well. The memory 1304 can include multiple different types of memory with different performance characteristics. The processor 1330 can include any general purpose processor and a hardware module or software module, such as module 1 1314, module 2 1316, and module 3 1318 embedded in storage device 1312. The hardware module or software module is configured to control the processor 1330, as well as a special-purpose processor where software instructions are incorporated into the actual processor design. The processor 1330 may essentially be a completely self-contained computing system that contains multiple cores or processors, a bus, memory controller, cache, etc. A multi-core processor may be symmetric or asymmetric.

To enable user interaction with the computing device 1300, an input device 1320 is provided as an input mechanism. The input device 1320 can comprise a microphone for speech, a touch-sensitive screen for gesture or graphical input, keyboard, mouse, motion input, and so forth. In some instances, multimodal systems can enable a user to provide multiple types of input to communicate with the system 1300. In this example, an output device 1322 is also provided. The communications interface 1324 can govern and manage the user input and system output.

Storage device 1312 can be a non-volatile memory to store data that is accessible by a computer. The storage device 1312 can be magnetic cassettes, flash memory cards, solid state memory devices, digital versatile disks, cartridges, random access memories (RAMs) 1308, read only memory (ROM) 1306, and hybrids thereof.

The controller 1310 can be a specialized microcontroller or processor on the system 1300, such as a BMC (baseboard management controller). In some cases, the controller 1310 can be part of an Intelligent Platform Management Interface (IPMI). Moreover, in some cases, the controller 1310 can be embedded on a motherboard or main circuit board of the system 1300. The controller 1310 can manage the interface between system management software and platform hardware. The controller 1310 can also communicate with various system devices and components (internal and/or external), such as controllers or peripheral components, as further described below.

The controller 1310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1310 to initiate or conduct specific hardware recovery procedures or operations, as further described below.

The controller 1310 can also include a system event log controller and/or storage for managing and maintaining events, alerts, and notifications received by the controller 1310. For example, the controller 1310 or a system event log controller can receive alerts or notifications from one or more devices and components, and maintain the alerts or notifications in a system event log storage component.

Flash memory 1332 can be an electronic non-volatile computer storage medium or chip that can be used by the system 1300 for storage and/or data transfer. The flash memory 1332 can be electrically erased and/or reprogrammed. Flash memory 1332 can include EPROM (erasable programmable read-only memory), EEPROM (electrically erasable programmable read-only memory), ROM, NVRAM, or CMOS (complementary metal-oxide semiconductor), for example. The flash memory 1332 can store the firmware 1334 executed by the system 1300 when the system 600 is first powered on, along with a set of configurations specified for the firmware 1334. The flash memory 1332 can also store configurations used by the firmware 1334.

The firmware 1334 can include a Basic Input/Output System or equivalents, such as an EFI (Extensible Firmware Interface) or UEFI (Unified Extensible Firmware Interface). The firmware 1334 can be loaded and executed as a sequence program each time the system 1300 is started. The firmware 1334 can recognize, initialize, and test hardware present in the system 600 based on the set of configurations. The firmware 1334 can perform a self-test, such as a POST (Power-On-Self-Test), on the system 1300. This self-test can test the functionality of various hardware components such as hard disk drives, optical reading devices, cooling devices, memory modules, expansion cards, and the like. The firmware 1334 can address and allocate an area in the memory 1304, ROM 1306, RAM 1308, and/or storage device 1312, to store an operating system (OS). The firmware 1334 can load a boot loader and/or OS, and give control of the system 1300 to the OS.

The firmware 1334 of the system 1300 can include a firmware configuration that defines how the firmware 1334 controls various hardware components in the system 1300. The firmware configuration can determine the order in which the various hardware components in the system 1300 are started. The firmware 1334 can provide an interface, such as an UEFI, that allows a variety of different parameters to be set, which can be different from parameters in a firmware default configuration. For example, a user (e.g., an administrator) can use the firmware 1334 to specify clock and bus speeds, define what peripherals are attached to the system 1300, set monitoring of health (e.g., fan speeds and CPU temperature limits), and/or provide a variety of other parameters that affect overall performance and power usage of the system 1300. While firmware 1334 is illustrated as being stored in the flash memory 1332, one of ordinary skill in the art will readily recognize that the firmware 1334 can be stored in other memory components, such as memory 1304 or ROM 1306.

System 1300 can include one or more sensors 1326. The one or more sensors 1326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1326 can communicate with the processor, cache 1328, flash memory 1332, communications interface 1324, memory 1304, ROM 1306, RAM 1308, controller 1310, and storage device 1312, via the bus 1302, for example. The one or more sensors 1326 can also communicate with other components in the system via one or more different means, such as inter-integrated circuit (I2C), general purpose output (GPO), and the like. Different types of sensors (e.g., sensors 1326) on the system 1300 can also report to the controller 1310 on parameters, such as cooling fan speeds, power status, operating system (OS) status, hardware status, and so forth. A display 1336 may be used by the system 1300 to provide graphics related to the applications that are executed by the controller 1310.

FIG. 14 illustrates an example computer system 1400 having a chipset architecture that can be used in executing the described method(s) or operations, and generating and displaying a graphical user interface (GUI). Computer system 1400 can include computer hardware, software, and firmware that can be used to implement the disclosed technology. System 1400 can include a processor 1410, representative of a variety of physically and/or logically distinct resources capable of executing software, firmware, and hardware configured to perform identified computations. Processor 1410 can communicate with a chipset 1402 that can control input to and output from processor 1410. In this example, chipset 1402 outputs information to output device 1414, such as a display, and can read and write information to storage device 1416. The storage device 1416 can include magnetic media, and solid state media, for example. Chipset 1402 can also read data from and write data to RAM 1418. A bridge 1404 for interfacing with a variety of user interface components 1406, can be provided for interfacing with chipset 1402. User interface components 1406 can include a keyboard, a microphone, touch detection, and processing circuitry, and a pointing device, such as a mouse.

Chipset 1402 can also interface with one or more communication interfaces 1408 that can have different physical interfaces. Such communication interfaces can include interfaces for wired and wireless local area networks, for broadband wireless networks, and for personal area networks. Further, the machine can receive inputs from a user via user interface components 1406, and execute appropriate functions, such as browsing functions by interpreting these inputs using processor 1410.

Moreover, chipset 1402 can also communicate with firmware 1412, which can be executed by the computer system 1400 when powering on. The firmware 1412 can recognize, initialize, and test hardware present in the computer system 1400 based on a set of firmware configurations. The firmware 1412 can perform a self-test, such as a POST, on the system 1400. The self-test can test the functionality of the various hardware components 1402-1418. The firmware 1412 can address and allocate an area in the memory 1418 to store an OS. The firmware 1412 can load a boot loader and/or OS, and give control of the system 1400 to the OS. In some cases, the firmware 1412 can communicate with the hardware components 1402-1410 and 1414-1418. Here, the firmware 1412 can communicate with the hardware components 1402-1410 and 1414-1418 through the chipset 1402, and/or through one or more other components. In some cases, the firmware 1412 can communicate directly with the hardware components 1402-1410 and 1414-1418.

It can be appreciated that example systems 1300 (in FIG. 13) and 1400 can have more than one processor (e.g., 1330, 1410), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A virtual desktop system comprising:
a plurality of interchangeable virtual desktops and associated cloud resources, the cloud resources including different servers and persistent storage devices that each provide one of the interchangeable virtual desktops, each of the plurality of interchangeable virtual desktops and associated cloud resources meeting requirements including processing capability, storage capability, and latency for a logical desktop provided to a client device, wherein each of the virtual desktops and associated cloud resources are associated with a cloud region and executed by a processor;
a memory device storing a prioritized list of the cloud resources that each provide one of the plurality of interchangeable identical virtual desktops, wherein the prioritized list orders the cloud resources that provide each of the plurality of interchangeable virtual desktops by ratings associated with one of processing capability, storage capability, and latency of each of the cloud resources; and
a control plane coupled to the cloud region, the control plane executed by a processor, wherein in response to a client device application executed by an endpoint device requesting the logical desktop, the control plane selects the one of the cloud resources to provide one of the associated plurality of interchangeable virtual desktops having a highest priority on the prioritized list and provides access to the selected cloud resources to provide the virtual desktop to the client device and wherein at least one of the associated cloud resources is pre-created prior to a request to access the logical desktop and wherein at least one of the associated cloud resources is created in response to the request to access the logical desktop.

2. The system of claim 1, wherein the control plane is operable to determine a change in a condition of the system and based on the change in the condition, select another of the plurality of virtual desktops for access to the client device.

3. The system of claim 2, wherein the change in condition is an unavailability of the cloud region of the virtual desktop.

4. The system of claim 1, wherein the cloud resources include a desktop template associated with the virtual desktop.

5. The system of claim 1, wherein the requirements include an operating system for the logical desktop.

6. The system of claim 5, wherein the requirements include at least one of a cost constraint, a billing rate plan constraint, a usability constraint, and a reliability constraint.

7. The system of claim 1, wherein the control plane is operable to prioritize the plurality of virtual desktops based on a condition of the virtual desktop system.

8. The system of claim 7, wherein the condition includes at least one of availability, and cost.

9. The system of claim 1, wherein at least two of the virtual desktops are created in the same cloud region.

10. The system of claim 1, wherein at least two of the virtual desktops are created in different availability zones in the same cloud region.

11. The system of claim 1, wherein at least two of the virtual desktops are created in different cloud regions.

12. The system of claim 1, wherein the control plane causes creation of required cloud infrastructure to support a virtual desktop in an additional cloud region in response to the user requesting the logical desktop.

13. A method for providing access to a logical desktop to a user operating a client device, the method comprising:
determining requirements of the logical desktop provided to the client device, the requirements including processing capability, storage capability, and latency;
determining a plurality of interchangeable virtual desktops and associated cloud resources meeting the requirements of the logical desktop, each of the virtual desktops and associated cloud resources associated with a cloud region coupled to a control plane, the cloud resources including different servers and persistent storage devices that each provide one of the interchangeable virtual desktops;
prioritizing each of the cloud resources that each provide one of the determined plurality of interchangeable virtual desktops via the control plane by ordering the cloud resources that provide each of the plurality of interchangeable virtual desktops by ratings associated with one of processing capability, storage capability, and latency of each of the cloud resources;
storing a prioritized list of the cloud resources that each provide one of the plurality of interchangeable virtual desktops, wherein the prioritized list orders the cloud resources that provide each of the plurality of interchangeable virtual desktops by ratings associated with one of processing capability, storage capability, and latency of each of the cloud resources;
receiving a request from the user operating the client device for the logical desktop;
selecting a highest priority one of the cloud resources to provide the associated virtual desktop of the plurality of interchangeable virtual desktops via the control plane wherein at least one of the associated cloud resources is pre-created prior to the request for the logical desktop and wherein at least one of the associated desktop resources is created in response to the request for the logical desktop; and providing access to the selected cloud resources to provide the virtual desktop to the client device.

14. The method of claim 13, further comprising:

determining a change in a condition of the virtual desktops; and based on the change in the condition, selecting another of the plurality of virtual desktops for access by the client device.

15. The method of claim 14, wherein the change in condition is an unavailability of the cloud region of the virtual desktop.

16. The method of claim 13, wherein the requirements include an operating system for the virtual desktop.

17. The method of claim 16, wherein the logical desktop requirements include at least one of a cost constraint, a billing rate plan constraint, a usability constraint, and a reliability constraint.

18. The method of claim 13, wherein at least two of the virtual desktops are created in the same cloud region.

19. The method of claim 13, wherein at least two of the virtual desktops are created in different availability zones in the same cloud region.

20. The method of claim 13, further comprising creating a required cloud infrastructure to support a virtual desktop in an additional cloud region in response to the user requesting the logical desktop.

* * * * *